US008693018B2

(12) United States Patent
Ito

(10) Patent No.: US 8,693,018 B2
(45) Date of Patent: Apr. 8, 2014

(54) PRINTING SYSTEM AND PRINT CONTROL METHOD

(75) Inventor: Mario Ito, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 46 days.

(21) Appl. No.: 13/568,753

(22) Filed: Aug. 7, 2012

(65) Prior Publication Data

US 2013/0050728 A1 Feb. 28, 2013

(30) Foreign Application Priority Data

Aug. 30, 2011 (JP) ................................ 2011-187668

(51) Int. Cl.
*G06F 3/12* (2006.01)
*G06K 15/00* (2006.01)
*G06F 3/048* (2013.01)

(52) U.S. Cl.
USPC ......... 358/1.13; 358/1.15; 358/1.14; 715/825

(58) Field of Classification Search
None
See application file for complete search history.

(56) References Cited

U.S. PATENT DOCUMENTS

| | | | | |
|---|---|---|---|---|
| 7,619,765 | B2 * | 11/2009 | Kimura et al. | 358/1.15 |
| 7,948,654 | B2 * | 5/2011 | Ozawa et al. | 358/1.9 |
| 2005/0068561 | A1 * | 3/2005 | Tonegawa | 358/1.13 |

FOREIGN PATENT DOCUMENTS

| | | |
|---|---|---|
| JP | 2008-131388 A | 6/2008 |

* cited by examiner

*Primary Examiner* — Thomas Lett
(74) *Attorney, Agent, or Firm* — Canon USA, Inc., IP Division

(57) ABSTRACT

A printing system includes a print service and an image forming apparatus having a web browser to display a screen provided from a web server. The web server includes a print instruction unit, a print status acquisition unit, a screen generation unit, and a screen transmission unit. The print instruction unit transmits, to the print, a print instruction according to a received print request. The print status acquisition unit acquires a print status of print data. The screen generation unit generates a job information screen that corresponds to the acquired print status. The screen transmission unit transmits the generated job information screen. The print status acquisition unit acquires the print status based on information that was notified, in response to a change in the print status, from an image forming apparatus that acquires the print data from the print service and executes printing based on the acquired print data.

9 Claims, 22 Drawing Sheets

```
     HTTP/1.1 200 OK
     Date: Tue, 21 Sep 2010 07:42:11GMT
     Server: Microsoft-IIS/6.0
     Cache-Control: private
801  X-Webservice-ServiceAddress: http://127.0.0.1:8000/aa/bb
802  X-Webservice-RequestTimeout: 120
803  X-Webservice-ContentType: application/soap+xml
804  X-Webservice-UploadAddress: http://aaa.co.jp/bbb/ccc
805  Content-Type: application/vnd.eeeee.webservice
     Content-Length: 2388
```

```
     <?xml version="1.0" encoding="UTF-8"?>
     <JobScript xmlns="http://www.eeeee.co.jp/jobScript">
         <Scan>
             <Settings>
                 <DocumentSize>auto</DocumentSize>
901              <Color>glayscale</Color>
             </Settings>
         </Scan>
         <Send>
             <Settings>
                 <Protocol>FTP</Protocol>
                 <Destination>192.168.11.10</Destination>
902              <FileFormat>PDF</FileFormat>
                 <FileName>test.pdf</FileName>
             </Settings>
         </Send>
     </JobScript>
```

901: <Scan> … </Scan>

902: <Send> … </Send>

FIG.12A

```
<?xml version="1.0" encoding="UTF-8"?>
<PrintService xmlns="http://www.xxxxx.printservice/job">
    <Print>
        <Printer>
            <id>printer12345</id>
        </Printer>
        <Settings>
            <DocumentSize>auto</DocumentSize>
            <Color>glayscale</Color>
            <Duplex>1-Side</Duplex>
            <Destination>http://172.24.22.203/7654321</Destination>
        </Settings>
    </Print>
</PrintService>
```

```
<?xml version="1.0" encoding="UTF-8"?>
<PrintResponse>
    xmlns="http://www.xxxxx.printservice/jobResponse">
    <JobID>job1234567</JobID>
</PrintResponse>
```

1404

FIG.13A
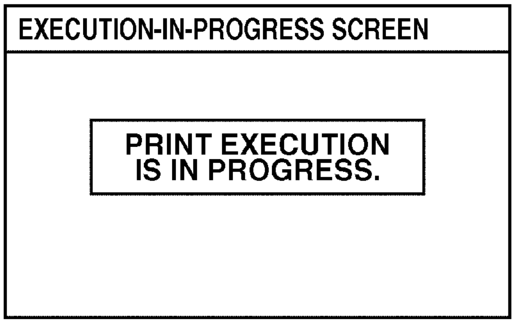
FIG.13B
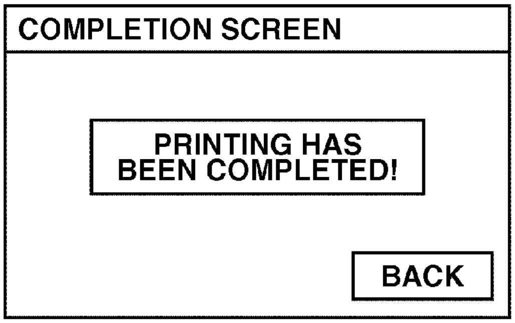
FIG.13C
1501
```
<html>
  <head>
    <meta http-equiv="refresh" content="10">
  </head>
  <body>
    <div align="center">PRINT EXECUTION IS IN PROGRESS.</div>
  </body>
</html>
```

FIG.14

```
<PrintJob>
  <Printerid>
    <Item>printer12345</Item>
  </Printerid>
  <id>
    <Item>8023610500269699</Item>
  </id>
  <title>
    <Item>Doc1</Item>
  </title>
  <status>
    <Item>QUEUED</Item>
  </status>
  <dataUrl>
    <Item>http://prt.srv.com/data/8023610500269699</Item>
  </dataUrl>
  <settingUrl>
    <Item>http://prt.srv.com/setting/8023610500269699</Item>
  </settingUrl>
</PrintJob>
```

1601 (dataUrl)

1602 (settingUrl)

FIG.15

```
<?xml version="1.0" encoding="UTF-8"?>
<PrintSettings>
    <DocumentSize>auto</DocumentSize>
    <Color>glayscale</Color>
    <Duplex>1-Side</Duplex>
</PrintSettings>
```

FIG.16A

```
<?xml version="1.0" encoding="UTF-8"?>
<Control>
    <JobID>job1234567</JobID>      (1801)
    <Status>DONE</Status>          (1802)
</Control>
```

FIG.16B

```
<?xml version="1.0" encoding="UTF-8"?>
<ControlResponse>
    <Success>true</Success>
    <Message>Job updated successfully.</Message>
</ControlResponse>
```

FIG.17A

```
<?xml version="1.0" encoding="UTF-8"?>
<PrintService xmlns="http://www.xxxxx.printservice/job">
   <GetJobStatus>
      <JobID>job1234567</JobID>
   </GetJobStatus>
</PrintService>
```

1901 (`<JobID>job1234567</JobID>`)

FIG.17B

```
<?xml version="1.0" encoding="UTF-8"?>
<GetJobStatusResponse
   xmlns="http://www.xxxxx.printservice/jobResponse">
   <JobStatus>DONE</JobStatus>
</GetJobStatusResponse>
```

1902 (`<JobStatus>DONE</JobStatus>`)

FIG.19

```
     <?xml version="1.0" encoding="UTF-8"?>
     <JobScript xmlns="http://www.eeeee.co.jp/jobScript">
        <Subscribe>
           <Settings>
2101          <JobId>job1234567</JobId>
2102          <Status>DONE</Status>
2103          <address>http://www.eeee.co.jp/webapp/</address>
           </Settings>
        </Subscribe>
     </JobScript>
```

```xml
<?xml version="1.0" encoding="UTF-8"?>
<JobStatusChanged>
    <JobId>job1234567</JobId>
    <Status>DONE</Status>
</JobStatusChanged>
```

```xml
<?xml version="1.0" encoding="UTF-8"?>
<JobStatusChanged>
    <JobId>job1234567</JobId>
    <Status>ERROR</Status>
</JobStatusChanged>
```

PRINTING SYSTEM AND PRINT CONTROL METHOD

BACKGROUND OF THE INVENTION

1. Field of the Invention

The present invention relates to a printing system and a print control method.

2. Description of the Related Art

A content printing system that allows a client to transmit a print instruction to a server and causes the server to convert a print target content into print data in response to the received print instruction is conventionally proposed. A cloud computing is a recently featured system that includes a server that can provides a service to a client.

The cloud computing is mainly characterized by simultaneously processing requests from many clients using many computing resources to discretely execute data conversion and data processing. At present, many vendors are available for computer users who require web services installed on cloud computing environments that can realize such a cloud computing system capable of providing various types of services.

Google (registered trademark) is one of the noteworthy vendors that can provide numerous services on the cloud computing environments. Google has many large-scale data centers and proposes a variety of services based on association with devices. Google has developed an infrastructure for data communications between a device and the service. For example, Google has developed a data communication infrastructure that can provide various services in association with an image forming apparatus. The interface via which the image forming apparatus can perform data communications in the cloud computing environments prepared by Google is currently opened to the public. According to the introduced system, the image forming apparatus receives a print request from the service and performs printing according to the received print request. Further, acquiring a change in print status is feasible based on polling from a web application to the service.

There is a conventional system that allows an information processing apparatus (e.g., PC) connected to a web server via a network to display an operation screen provided by the web server using a web browser installed on the information processing apparatus. According to the conventional system, the web browser of the information processing apparatus requests the web server to transmit the operation screen. Then, in response to the request from the information processing apparatus, a web application of the web server sends a response including HTML data to the information processing apparatus so that the web browser can display the operation screen based on the received HTML data.

The web browser of the information processing apparatus analyzes the received HTML data and displays the operation screen based on a description of the HTML data. Further, if a user inputs an instruction via the operation screen displayed by the web browser, the web browser sends a notification including the input instruction to the web server. When the web application of the web server receives the notification from the web browser, the web application performs processing according to the input instruction.

Recently, the web browser has been installable on a multi function peripheral (MFP) having scanner and printer functions. In this case, the MFP displays the operation screen provided by the web server on the web browser of the MFP using the above-described procedure and receives various instructions from a user via the operation screen.

Further, according to another conventional system, the web server provides an operation screen that allows users to input instructions to use various functions of the MFP. Each user can input an instruction to be transmitted to the MFP via the operation screen displayed by the web browser. In the above-described system, the web server requests the MFP to perform processing according to the content of the instruction input by the user. When the MFP receives the request from the web server, the MFP performs the requested processing. In other words, it is unnecessary for the MFP to store all of the operation screens required to operate the MFP. Further, the operation screen can be easily modified or updated by the web server.

More specifically, as conventionally known by Remote Procedure Call (RPC), it is useful to open MFP functions to the public so that users can appropriately invoke a required MFP function from the web server. According to such a method, the web server can possess a main logic of the processing in such a way as to control the MFP or process user interactive processing. On the other hand, the MFP can reduce the burden in processing. For example, if the MFP functions are opened to the public as web services, each MFP function can be executed by calling a local sub routine from the web server. Further, when the server manages a response to the call, the server can possess the main logic of the processing.

Further, it is useful to provide an MFP operating system in which the web server provides a control script based on an instruction input via the operation screen displayed by the web browser and a device executes the control script.

In the above-described system, the control script is sent to the device as a response replying to the request from the web browser. Therefore, it is unnecessary to provide a connection between the web server and the MFP. The system is usable in a case where the MFP is protected by a firewall or in an environment requiring network address conversion.

As discussed in Japanese Patent Application Laid-Open No. 2008-131388, it is conventionally known that an image forming apparatus can change the content to be displayed on an operation panel according to an event occurring in the image forming apparatus.

The system discussed in Japanese Patent Application Laid-Open No. 2008-131388 is configured to perform display control for the operation panel using a web browser. Printing may be performed in the image forming apparatus discussed in Japanese Patent Application Laid-Open No. 2008-131388 or in a system including a web browser (e.g., MFP) capable of displaying an operation screen provided from the web server and performing processing according to a print instruction input via the displayed operation screen.

In this case, using various file formats managed by the web application in performing printing is generally difficult because installation of a file format conversion module is required for each of newly introduced file formats on the server or the MFP. The costs will increase greatly.

In other words, there is not any conventional printing system that can appropriately execute file format conversion processing when a print request transmitted from an image forming apparatus that includes a web browser to a web server includes the file format conversion settings.

Further, the technique discussed in Japanese Patent Application Laid-Open No. 2008-131388 is a technique that allows the image forming apparatus to change display contents according to an event caused by a hardware control in the image forming apparatus. Accordingly, the following problem may occur if the above-described technique is applied to the system in which an image forming apparatus transmits a print instruction to an external print service via a web server and the external print service generates print data according to the print instruction, and the image forming apparatus acquires the above-described print data and outputs a printed product.

More specifically, the technique discussed in Japanese Patent Application Laid-Open No. 2008-131388 cannot be used to update the screen supplied from the web server, which is displayed by the web browser of the image forming apparatus, according to a change in job status (print status) managed by the external print service.

SUMMARY OF THE INVENTION

Exemplary embodiments of the present invention are directed to a printing system that can appropriately perform file format conversion processing according to file format conversion settings, when an image forming apparatus including a web browser transmits a print request including the file format conversion settings to a web server.

Further, in a printing system according to the present invention, the image forming apparatus transmits a print instruction to an external print service via the web server, and the external print service generates print data according to the print instruction. Then, the image forming apparatus acquires the generated print data and outputs a printed product based on the acquired print data. The printing system updates a job information screen that can be provided from the web server, which is displayed by the browser of the image forming apparatus, according to a change in print status that can be managed by the external print service.

According to an aspect of the present invention, a printing system having a print service and an image forming apparatus including a web browser capable of displaying a screen provided from a web server, wherein the print service, the image forming apparatus, and the web server are connected with each other via a network, includes the web server, wherein the web server includes a print instruction unit configured to transmit, to the print service via the network, a print instruction according to a print request received from the image forming apparatus, a print status acquisition unit configured to acquire, via the network, a print status of print data that corresponds to the print instruction managed by the print service, a screen generation unit configured to generate a job information screen that corresponds to the print status acquired by the print status acquisition unit, and a screen transmission unit configured to transmit, to the web browser via the network, the job information screen generated by the screen generation unit, wherein the print status acquisition unit acquires the print status of print data that corresponds to the print instruction managed by the print service based on information, wherein that information was notified, in response to a change in the print status of the print data, from an image forming apparatus that acquires the print data from the print service and executes printing based on the acquired print data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B illustrate examples of a response header and a processing request.

FIGS. 12A and 12B illustrate examples of a print instruction that can be transmitted to the print service.

FIGS. 13A, 13B, and 13C illustrate example screens, including an execution-in-progress screen and a completion screen, of the content printing system.

FIG. 14 illustrates an example of a print instruction that can be transmitted to a printer.

FIG. 15 illustrates an example of print settings that can be acquired by a printer.

FIGS. 16A and 16B illustrate examples of a job status change instruction that can be transmitted to the print service.

FIGS. 17A and 17B illustrate examples of a job status acquisition request that can be transmitted to the print service.

FIG. 19 illustrates an example of an operation request that can be transmitted to the service provider.

FIGS. 20A and 20B illustrate examples of a job status change notification.

DESCRIPTION OF THE EMBODIMENTS

Various exemplary embodiments, features, and aspects of the invention will be described in detail below with reference to the drawings.

Figure 1:
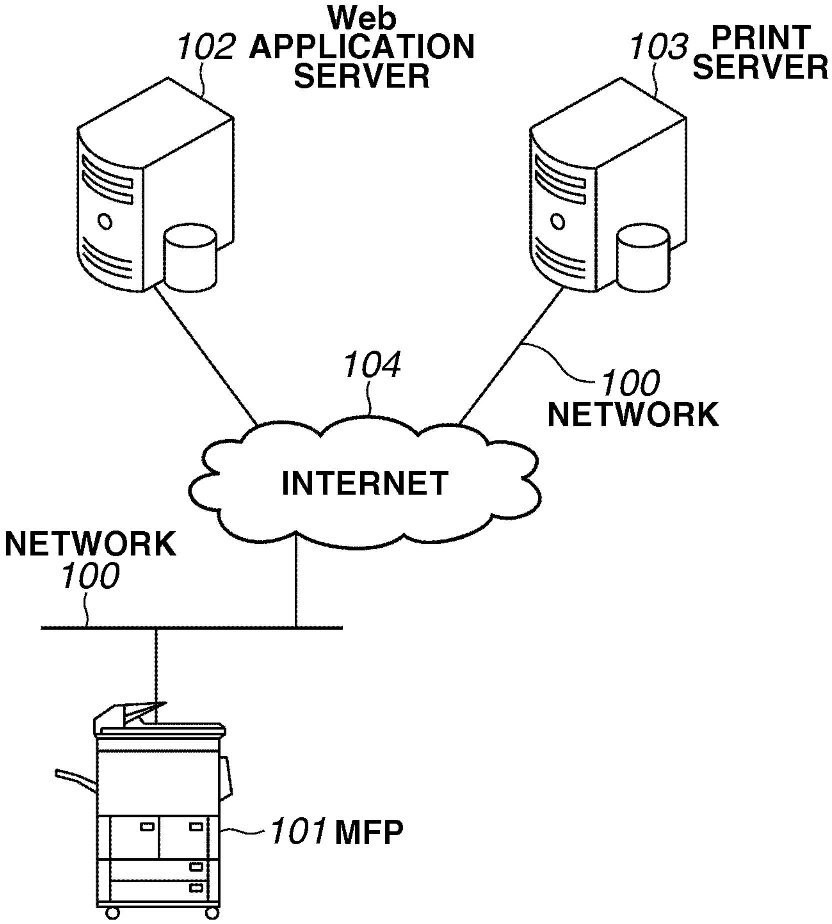
FIG. 1 illustrates an entire configuration of a content printing system according to an exemplary embodiment.

FIG. 1 illustrates an example configuration of a content printing system according to a first exemplary embodiment. The system illustrated in FIG. 1 includes a multi function peripheral (MFP) 101, a web application server 102, and a print server 103. The MFP 101, the web application server 102, and the print server 103 are connected to each other via Internet 104 and can communicate with each other to constitute the content printing system. A network 100 is a basis that allows respective devices to communicate with each other and is connected to the Internet 104.

The MFP 101 is an image forming apparatus that can request the web application server 102 and the print server 103, via the Internet 104, to execute various processing. The web application server 102 can distribute web contents via the network. For example, the web application server 102 transmits web contents to the MFP 101 in response to a request from the MFP 101. The print server 103 can receive various requests from the web application server 102 and the MFP 101. The print server 103 performs processing according to each request and returns a response to each apparatus.

The content printing system can include a plurality of apparatuses. Further, the content printing system can include a plurality of servers. Further, a local IP address is usable to manage the MFP 101. In this case, a gateway (not illustrated) is present between the network 100 and the MFP 101. The gateway can perform address conversion. For example, the gateway includes a router. Further, each of the gateway and the MFP 101 can include a firewall function.

Figure 2:
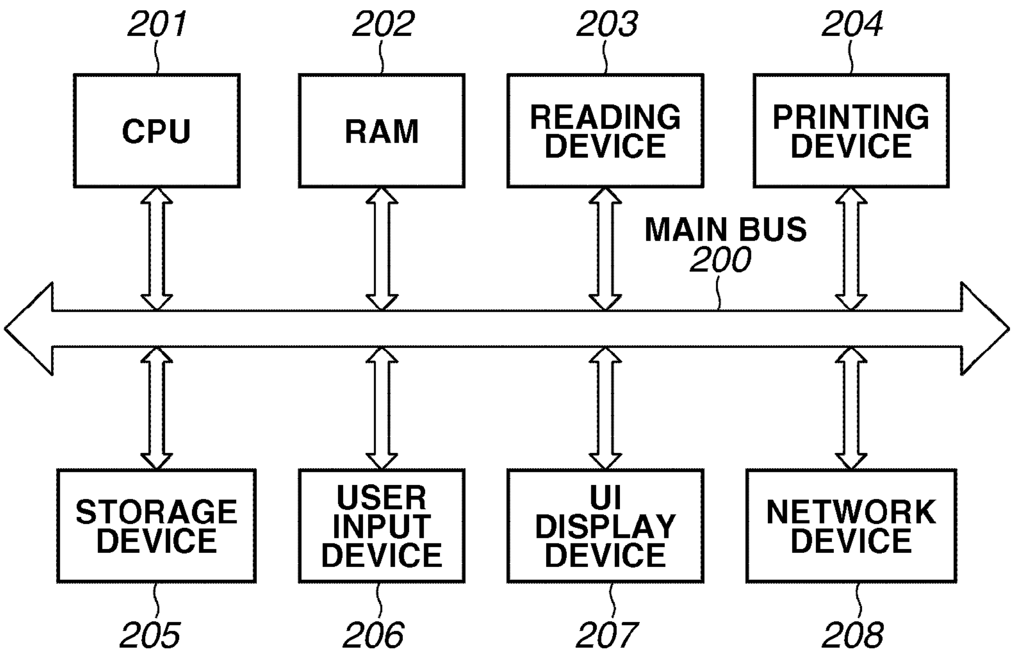
FIG. 2 is a block diagram illustrating an example configuration of MFP.

FIG. 2 illustrates an example device configuration of the MFP 101 according to the present exemplary embodiment. The MFP 101 includes a central processing unit (CPU) 201 that can realize various controls and a random access memory (RAM) 202 that can provide a work area for the CPU 201. Further, the MFP 101 includes a reading device 203 that can read various images, a printing device 204 that can print various images, and a storage device 205 that can store programs and various setting values. The storage device 205 can be a hard disc drive (HDD) or a non-volatile random access memory (NVRAM). Further, the MFP 101 includes a user input device 206 that allows users to input various commands, a user interface (UI) display device 207 that can display various screens, a network device 208 that can perform network communications with other devices, and a main bus 200 that connects the above-described constituent units of the MFP 101.

In the present exemplary embodiment, unless otherwise mentioned, the CPU 201 of the MFP 101 controls each constituent unit via the main bus 200. More specifically, the CPU 201 controls the RAM 202, the reading device 203, the printing device 204, the storage device 205, the user input device 206, the UI display apparatus 207, and the network device 208. Further, the UI display device 207 can be a touch-panel display device that includes a function comparable to the user input device 206.

Figure 3:
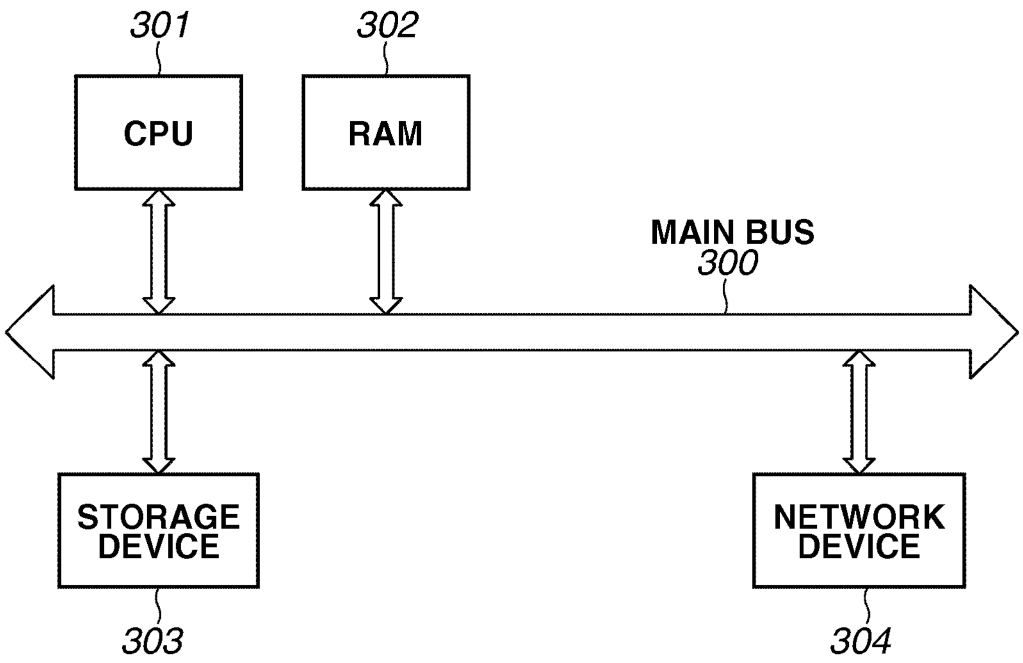
FIG. 3 is a block diagram illustrating an example configuration of a web application server or a print server.

FIG. 3 illustrates an example device configuration of the web application server 102 or the print server 103 according to the present exemplary embodiment. Each apparatus includes a CPU 301 that can realize various controls and a RAM 302 that can provide a work area for the CPU 301. Each apparatus further includes a storage device 303 that can store various programs and setting values, a network device 304 that can perform network communications with other devices, and a main bus 300 that connects the above-described constituent units of each apparatus. In the present exemplary embodiment, unless otherwise mentioned, the CPU 301 controls the RAM 302, the storage device 303, and the network device 304 via the main bus 300 to perform print processing according to the present exemplary embodiment.

Figure 4:
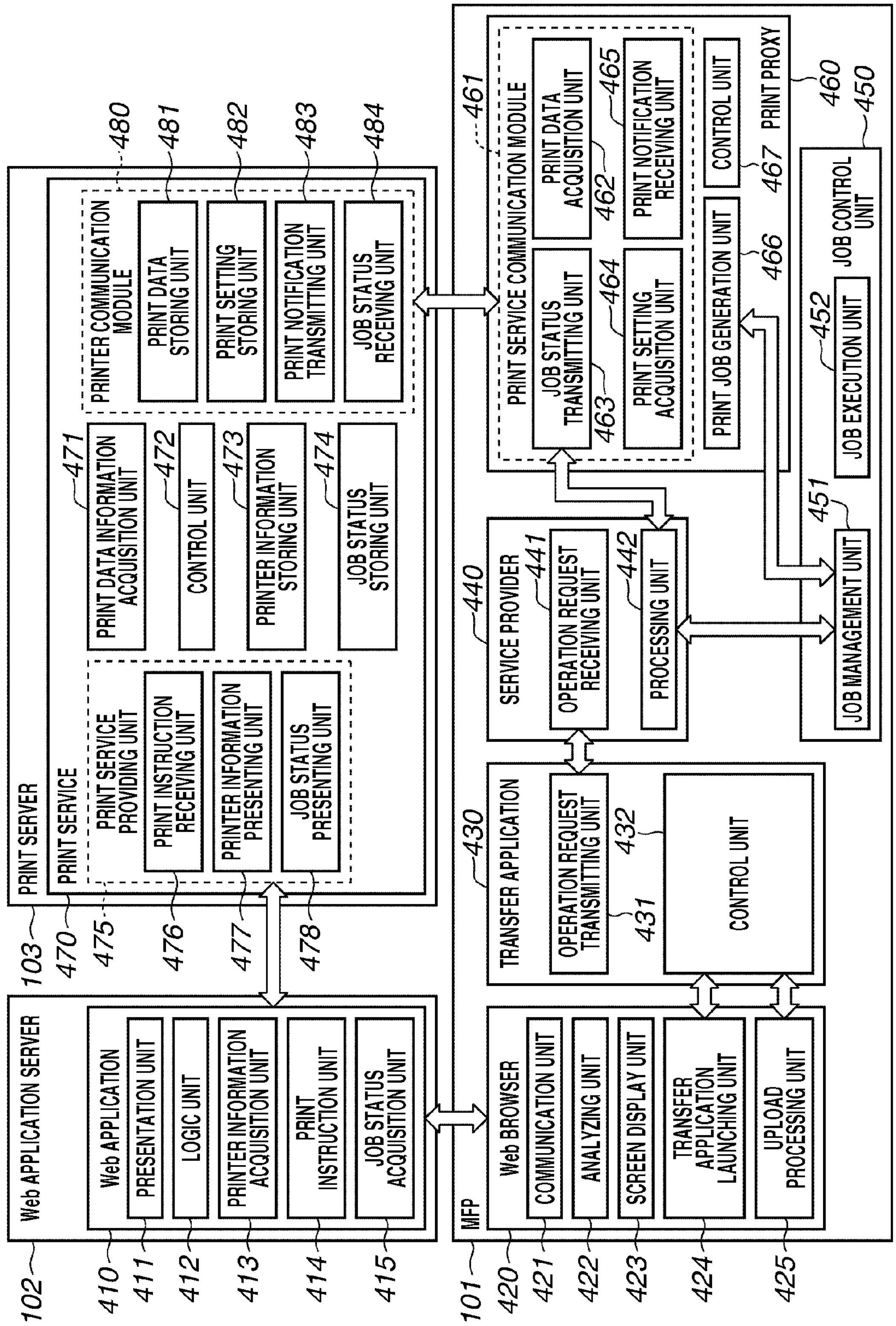
FIG. 4 illustrates an example software configuration of the content printing system according to an exemplary embodiment.

FIG. 4 illustrates an example software configuration of the content printing system according to the present exemplary embodiment. The CPU 201/the CPU 301 of the MFP 101/the web application server 102/the print server 103 executes a control program to realize functional units illustrated in FIG. 4.

The web application server 102 includes a web application 410. The web application 410 includes a presentation unit 411, a logic unit 412, a printer information acquisition unit 413, a print instruction unit 414, and a job status acquisition unit 415.

The presentation unit 411 can transmit a response including an operation screen to be displayed on a web browser 420 in response to a request from the MFP 101, or a processing request to be supplied to a service provider 440, to the MFP 101. Further, the presentation unit 411 can receive user information input via the operation screen displayed on the web browser 420 of the MFP 101 from the MFP 101.

The logic unit 412 can perform processing on the input information received from of the MFP 101, which is sent from the presentation unit 411. For example, the logic unit 412 changes a screen to be displayed according to an input from a user or generates a processing request to execute a device function of the MFP 101.

Each of the printer information acquisition unit 413, the print instruction unit 414, and the job status acquisition unit 415 can communicate with a print service providing unit 475 of a print service 470 according to an instruction from the logic unit 412. More specifically, the printer information acquisition unit 413 can transmit a list request to the printer information presenting unit 477. The print instruction unit 414 can transmit a print instruction including print settings to a print instruction receiving unit 476. The job status acquisition unit 415 can transmit a job status request to a job status presenting unit 478.

The MFP 101 includes the web browser 420, a transfer application 430, the service provider 440, a print proxy 460, and a job control unit 450. The CPU 201 of the MFP 101 executes a control program to realize each of the web browser 420, the transfer application 430, and the service provider 440. The web browser 420 is not limited to the browser that displays contents of the web application server 102. Similarly, the web application server 102 is not limited to the web server that transmits and receives requests/responses according to the HTTP protocol. The web browser 420 can be any type of browser that has the capability of acquiring various contents through communications with an arbitrary server and displaying screens based on the acquired contents.

The web browser 420 includes a communication unit 421, an analyzing unit 422, a screen display unit 423, a transfer application launching unit 424, and an upload processing unit 425. The communication unit 421 can communicate with the presentation unit 411 of the web application 410 included in the web application server 102 according to the HTTP protocol.

More specifically, the communication unit 421 can transmit a request including information input via the operation screen displayed by the web browser 420 to the web application 410. Further, the communication unit 421 can receive a response transmitted from the web application 410.

The analyzing unit 422 can analyze the response received from the web application 410. The response (i.e., analysis target) includes HTML data of a description indicating the content of an operation screen to be displayed by the web browser 420, or a processing request to be supplied to the service provider 440. The analyzing unit 422 determines whether the type in the Content-Type field of the HTTP response header is application/vnd.eeeee.webservice. If it is determined that the type in the Content-Type field is application/vnd.eeeee.webservice, the analyzing unit 422 determines that the response received from the web application 410 is the processing request to be supplied to the service provider 440. The analyzing unit 422 requests a transfer application launching unit 424 to perform processing in response to the received response.

The screen display unit 423 can display an operation screen on the UI display device 207 based on the analysis result obtained by the analyzing unit 422 with reference to the HTML data.

The transfer application launching unit 424 can determine that the response received from the web application 410 is the processing request based on the analysis result obtained by the analyzing unit 422 and can request the transfer application 430 to transfer the processing request to the service provider 440. Alternatively, if it is feasible to determine that the response is a processing request to be supplied to the MFP, a method that does not refer to the HTTP response header is employable.

The upload processing unit 425 can transmit designated data to the web application server 102 via the communication unit 421 according to a request from an internal device. In the present exemplary embodiment, the upload processing unit 425 uploads the designated data using a POST command of the HTTP protocol, or using any other protocol that can be processed by the web browser 420.

The transfer application 430 includes an operation request transmitting unit 431 and a control unit 432. The control unit 432 can receive a request from the transfer application launching unit 424 of the web browser 420 and can request the operation request transmitting unit 431 to transmit a processing request replying to a response to the service provider 440.

In response to the request received from the control unit 432, the operation request transmitting unit 431 can transfer a processing request to an operation request receiving unit 441 of the service provider 440. Further, the operation request transmitting unit 431 can receive a result of the processing from the service provider 440. In this case, the operation request transmitting unit 431 transfers the processing request to an address 801 described in a header 800 (see FIG. 7A) of the response received from the web application 410.

The transfer application 430 is an application that can transfer a part of the response received by the web browser 420 to the service provider 440 or can transfer the processing result of the service provider 440 to the web browser 420. The transfer application 430 is operable as a helper application that can process file (e.g., audio, moving image, and animation) data that cannot be generally processed by the web browser 420 and is operable independent of the web browser 420. However, the transfer application 430 is not required to be a helper application when the transfer application 430 has the capability of transferring the processing request. The transfer application 430 can be present as plug-in or web browser function, or as Java (registered trademark) Script described in the response received from the web application 410.

The service provider 440 includes the operation request receiving unit 441 and a processing unit 442. The operation request receiving unit 441 can receive a processing request from the transfer application 430. The processing unit 442 can perform requested processing according to the processing request received by the operation request receiving unit 441.

The service provider 440 is a program capable of performing various processing. If there is a plurality of functions, it is useful to provide a service provider dedicated to each function. For example, it is useful to provide a service provider having a print function and a service provider having a scanning function. In this case, each service provider registers a job to a job management unit 451 of the job control unit 450 according to the processing request.

The job control unit 450 includes the job management unit 451 and a job execution unit 452. The job management unit 451 can manage a job that uses a hardware resource (e.g., scanner or printer). The job execution unit 452 can perform processing according to a job managed by the job management unit 451.

The print proxy 460 includes a print service communication module 461, a print job generation unit 466, and a control unit 467. Further, the print service communication module 461 includes a print data acquisition unit 462, a job status transmitting unit 463, a print setting acquisition unit 464, and a print notification receiving unit 465.

The print service communication module 461 can communicate with a printer communication module 480 of the print service 470. More specifically, the print notification receiving unit 465 can receive notification information transmitted from a print notification transmitting unit 483 of the print service 470. The print service communication module 461 and the printer communication module 480 of the print service 470 constitute a pair of modules. Therefore, the print notification receiving unit 465 can interpret notification information transmitted from the print notification transmitting unit 483.

The print data acquisition unit 462 can acquire print data from the print data storing unit 481 based on print data acquisition destination information described in the notification information received by the print notification receiving unit 465. Further, the print setting acquisition unit 464 can acquire print settings from the print setting storing unit 483 based on print setting acquisition destination information based on the notification information received by the print notification receiving unit 465.

The control unit 467 can request the print job generation unit 466 to generate a job according to print data and print settings acquired from the print data acquisition unit 462 and the print setting acquisition unit 464. The print job generation unit 466 can generate a job according to the request of the control unit 467 and can register the generated job in the job management unit 451. The job status transmitting unit 463 is a module that can notify a change in the job status managed by the print service 470. The job status transmitting unit 463 transmits a job status change notification to a job status receiving unit 484 according to an instruction from a print control unit when the job status has changed (e.g., when the printing has been completed).

The print server 103 includes the print service 470. The print service 470 includes the print service providing unit 475, a print data information acquisition unit 471, a control unit 472, a printer information storing unit 473, a job status storing unit 474, and the printer communication module 480. The print server 103 can acquire print data from the web application 410. Then, the print server 103 can transmit the print data to a printer or a module having an interface that conforms to the pint data to perform printing.

The print service providing unit 475 includes the print instruction receiving unit 476, the printer information presenting unit 477, and the job status presenting unit 478. The printer information presenting unit 477 can generate a list of printers that can be used by a user based on user information when the printer information presenting unit 477 receives a list acquisition request from the printer information acquisition unit 413 of the web application 410. For example, the printer information presenting unit 477 generates a list illustrated in FIG. 11B and transmits the generated list to the printer information acquisition unit 413. The print instruction receiving unit 476 can receive a print instruction including print settings from the print instruction unit 414 of the web application 410.

The print data information acquisition unit 471 can receive print data acquisition destination information from the print instruction receiving unit 476 and can acquire print target contents from the web application 410 based on the received print data acquisition destination information. Further, the print data information acquisition unit 471 can receive the print settings and user selected printer ID information from the print instruction receiving unit 476. The printer ID is a unique identifier that is allocated to each printer and can be managed by the print service 470.

Further, if necessary, based on contents and print settings acquired from the web application 410, the print data information acquisition unit 471 may convert the contents into print data. More specifically, if a file format conversion is designated in the print settings, the print data information acquisition unit 471 performs file format conversion of the contents. Further, the print data information acquisition unit 471 can identify a file format that can be processed by the target printer that performs printing based on printer information stored in the printer information storing unit 473 and can convert the contents according to the file format. Information described in the printer information includes printer ID, printer name, and printable file format of a printer that can receive a print instruction from the print server.

The control unit 472 can acquire print data, print settings, and printer ID information from the print data information acquisition unit 471. The printer communication module 480 can communicate with the MFP 101 including the print service communication module 461. The printer communication module 480 is an interface that allows two devices to perform data communications. The printer communication module 480 includes the print data storing unit 481, a print setting storing unit 482, the print notification transmitting unit 483, and the job status receiving unit 484.

The print data storing unit 481 can store print data received from the control unit 472. The print setting storing unit 482 can store print settings received from the control unit 472. The control unit 472 can instruct the print notification transmitting unit 483 to transmit notification information when a storage completion notice is received from the print data storing unit 481 and the print setting storing unit 482. The job status receiving unit 484 can receive the job status change notification from the job status receiving unit 463 of the print service communication module 461 and can store the received job status change notification in the job status storing unit 474. The job status storing unit 474 can receive job ID information from the job status presenting unit 478 and can transmit job status information corresponding to the received job ID to the job status presenting unit 478.

The job status presenting unit 478 can receive a request including job ID information from the job status acquisition unit 415 of the web application 410. The job status presenting unit 478 can transmit the job ID information to the job status storing unit 474 according to the request. Further, the job status presenting unit 478 can receive job status information from the job status storing unit 474 and can transmit the received job status to the job status acquisition unit 415.

The print notification transmitting unit 483 can acquire information indicating the storage place of print data and the storage place of print settings from the control unit 472 if the print notification transmitting unit 483 is instructed by the control unit 472 to transmit notification information. The print notification transmitting unit 483 can generate notification information based on the acquired information. Further, the print notification transmitting unit 483 can acquire printer ID information from the control unit 472 and can identify proxy ID based on information stored in the printer information storing unit 473. The proxy ID is a unique identifier that is allocated to each print service communication module 461 and can be managed by the print service 470. The print notification transmitting unit 483 can transmit notification information to an interface that has the identified proxy ID to notify that print data corresponding to the printer ID managed by the proxy has been prepared.

The notification information conforms to a communication method that is unique to the print service 470. The communication requires the installation of an interface that can interpret the above-described unique communication method. If the interface is installed on a printer, the printer can be directly registered to the print server. If the interface is installed on a communication device of the server or the client, it can be registered as a proxy. In the present exemplary embodiment, an interface that can interpret the above-described unique communication method is installed on the print service communication module 461, so that the print service communication module 461 can communicate with the printer communication module 480.

The infrastructure that allows the printer communication module 480 to communicate with the print service communication module 461 is referred to as a vendor infrastructure that provides the print server 103. The vendor infrastructure is deeply dependent on the vendor that manages the print server 103. The vendor that manages the print server 103 installs the printer communication module 480 on the print server 103 and the infrastructure of the print service communication module required to communicate with the print service communication module 480 is opened to the public. The interfaces of the printer communication module 480 and the print service communication module 461 are interfaces that can be generated in conformity with the data communication infrastructure provided by the vendor that manages the print server 103.

Figure 5:
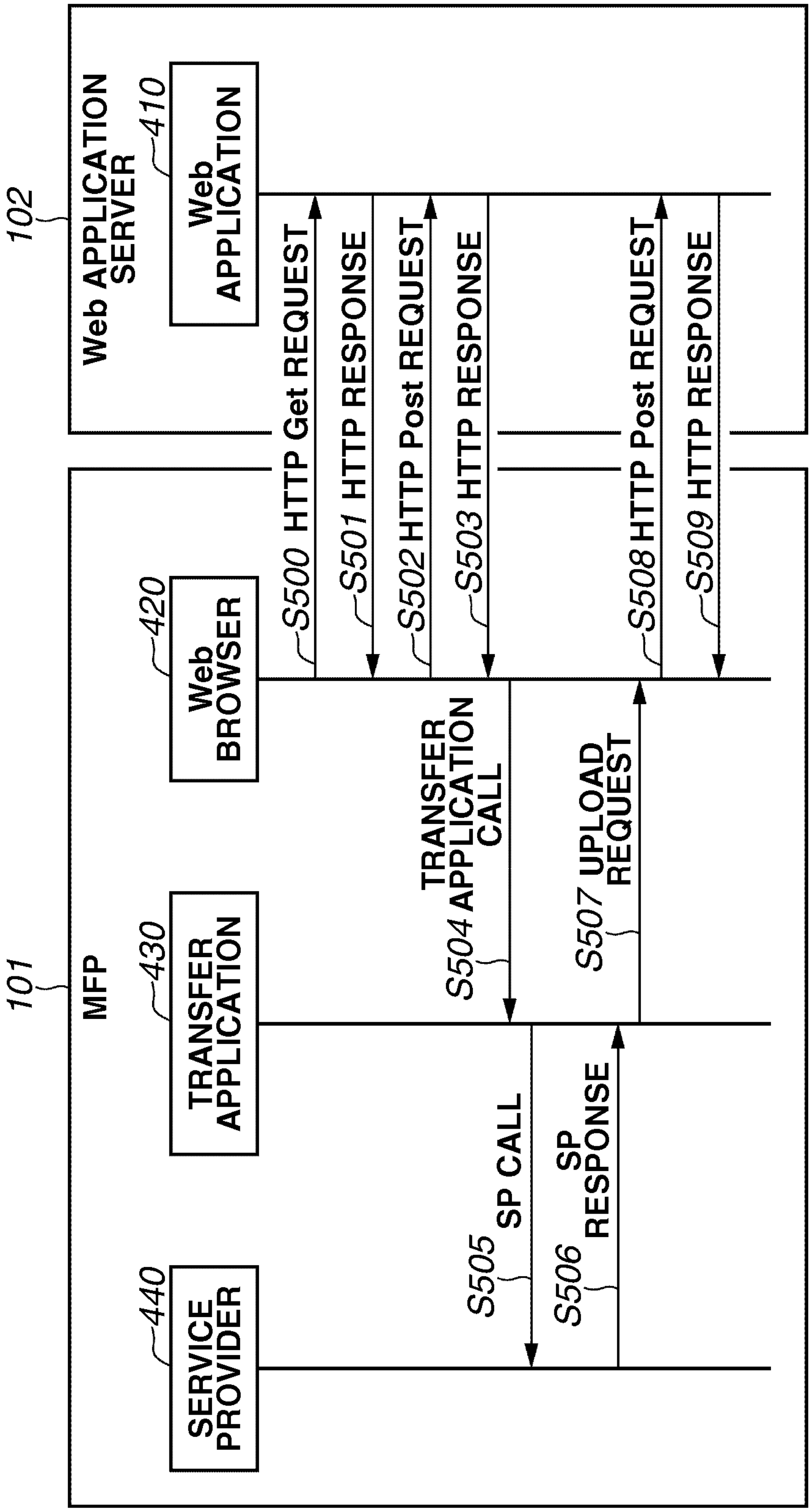
FIG. 5 is a sequence diagram illustrating sequential processing that can be performed when a processing request is transmitted from a web application to a provider according to an exemplary embodiment.

An information processing system according to the present exemplary embodiment can use the service provider in the following manner. FIG. 5 is a sequence diagram illustrating sequential processing that can be performed by the information processing system according to the present exemplary embodiment to execute scanning using the service provider.

First, if a user presses a launching button (not illustrated) via the user input device 206 of the MFP 101, the MFP 101 launches the web browser 420. The launching button is, for example, a hardware button or can be a virtual button displayed on a touch panel. When the web browser 420 is launched, the web browser 420 sends a setting screen request to the web application 410 of the web application server 102. In the present exemplary embodiment, it is presumed that the URL indicating setting screen contents is set beforehand in the MFP 101.

In step S500, the web browser 420 sends an HTTP GET command including a request, to the web application 410 that holds the content indicated by the URL. More specifically, the web browser 420 communicates with the web application 410 of the web application server 102 via the communication unit 421, using the HTTP protocol. The request can be transmitted from the web browser 420 to the web application 410 through the communication, although the operation of the communication unit 421 is not described in detail.

In step S501, the logic unit 412 of the web application 410 generates HTML data of a setting screen in response to the request received in step S500. The presentation unit 411 transmits HTML data, as an HTTP response, to the web browser 420. The analyzing unit 422 of the web browser 420 analyzes the received HTML data and causes the UI display device 207 to display the setting screen via the screen display unit 423.

In step S502, the web browser 420 instructs the web application 410 to execute processing. If a user presses a setting screen button displayed in step S501, the web browser 420 sends a notification including parameters having been set on the setting screen to the web application 410. More specifically, the web browser 420 generates a print request and the web application 410 receives the print request from the web browser 420. In this case, a POST command of the HTTP protocol is usable in the communication between the web browser 420 and the web application 410.

Figure 6A:
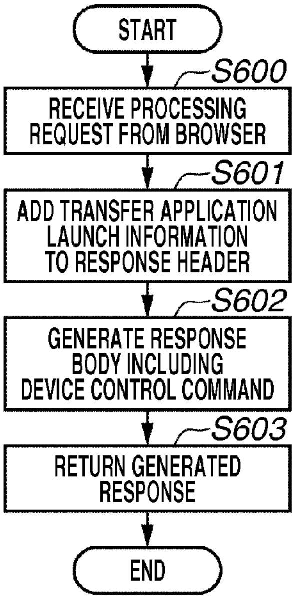
FIGS. 6A and 6B are flowcharts illustrating web server response processing and MFP processing according to an exemplary embodiment.

FIG. 6A is a flowchart illustrating example server processing to be performed in step S503 illustrated in FIG. 5. The logic unit 412 of the web application 410 generates a response.

In step S600, the web application 410 receives the information notified from the web browser 420 in step S502 illustrated in FIG. 5. In step S601, the logic unit 412 generates the HTTP response header 800 based on the POST command information transmitted in step S502.

In step S602, the logic unit 412 generates a processing request 900 for execution of processing in the MFP 101, as an HTTP response body, based on the POST command information transmitted in step S502. In step S603, the web application 410 transmits an HTTP response, which combines the HTTP response header generated in step S601 and the HTTP response body generated in step S602, to the web browser 420.

Figure 6B:
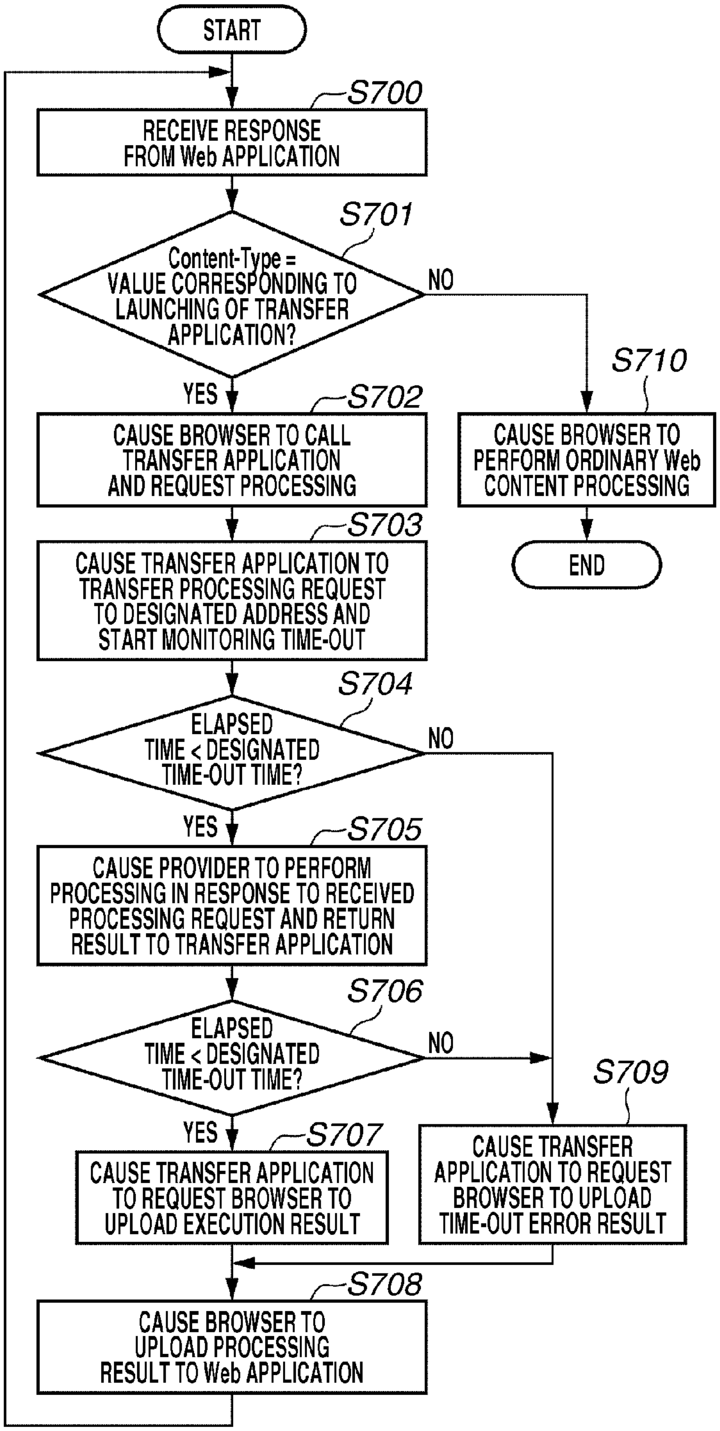

FIG. 6B is a flowchart illustrating example processing that can be performed by the MFP 101 in step S503 through step S509 illustrated in FIG. 5. Processing to be performed in step S700, step S701, and step S702 corresponds to the processing to be performed in step S504 illustrated in FIG. 5. In step S700, the web browser 420 receives the HTTP response transmitted by the web application 410 in step S603. The HTTP response includes the HTTP response header 800 and the HTTP response body.

In step S701, the analyzing unit 422 determines whether the type in the Content-Type field of the HTTP response header received in step S700 is application/vnd.eeeee.webservice. If it is determined that the type in the Content-Type field is application/vnd.eeeee.webservice (YES in step S701), the operation proceeds to step S702. If it is determined that the type in the Content-Type field is not application/vnd.eeeee.webservice (NO in step S701), the operation proceeds to step S710.

In step S702, the transfer application launching unit 424 requests the control unit 432 of the transfer application 430 to transfer the HTTP response body received in step S700 to the service provider 440. In this case, the transfer application launching unit 424 sends the HTTP response header received in step S700, as information required in the transfer, to the control unit 432.

Processing to be performed in step S703 and step S704 corresponds to the processing to be performed in step S505 illustrated in FIG. 5. In step S703, the control unit 432 starts transmitting the HTTP response body received in step S700, via the operation request transmitting unit 431, to the address 801 described in the HTTP response header received in step S702. In the present exemplary embodiment, the control unit 432 uses a POST command of the HTTP protocol to perform transmission, although other transmission method can be used. Further, the control unit 432 starts acquiring the present time and monitoring the time-out.

In step S704, the control unit 432 determines whether the time required for the transmission processing started in step S703 is shorter than a designated time-out time 802. If the control unit 432 determines that the transfer time has not exceeded the time-out time 802 (YES in step S704), the operation proceeds to step S705. If the control unit 432 determines that the transfer time has exceeded the time-out time 802 (NO in step S704), the operation proceeds to step S709.

Processing to be performed in step S705 and step S706 corresponds to the processing to be performed in step S506 illustrated in FIG. 5. In step S705, the operation request receiving unit 441 of the service provider 440 receives the processing request 900 transmitted by the transfer application 430 in step S703. The processing unit 442 generates a job according to the processing request 900. Further, the service provider 440 starts transmitting a response including an execution result 1000, via the operation request receiving unit 441, to the transfer application 430.

In step S706, the control unit 432 determines whether the time required for transmission processing started in step S705 is shorter than the designated time-out time 802. If the control unit 432 determines that the transmission completion time has not exceeded the time-out time 802 (YES in step S706), the operation proceeds to step S707. If the control unit 432 determines that the transmission completion time has exceeded the time-out time 802 (NO in step S706), the operation proceeds to step S709.

Processing to be performed in step S707 or step S709 corresponds to the processing to be performed in step S507 illustrated in FIG. 5. In step S707, the control unit 432 of the transfer application 430 receives the execution result 1000 via the operation request transmitting unit 431. Subsequently, the control unit 432 requests the upload processing unit 425 of the web browser 420 to upload the execution result 1000, to the web application 410. When the control unit 432 requests the upload, the control unit 432 notifies the upload processing unit 425 of upload address 804 as address designated for the upload. The upload address 804 is information described in the HTTP response header 800. In a case where the transfer application 430 does not designate the upload processing unit 425, the web browser 420 can store the above-described information and can use the stored information. Further, if the address is a fixed value, the system does not require any designation from the web application 410.

In step S709, the control unit 432 of the transfer application 430 generates an error result 1100. Subsequently, the control unit 432 requests the upload processing unit 425 of the web browser 420 to upload the error result 1100 to the web application 410. When the control unit 432 requests the upload, the control unit 432 notifies the upload processing unit 425 of the upload address 804 as address designated for the upload. The upload address 804 is information described in the HTTP response header 800. In a case where the transfer application 430 does not designate the upload processing unit 425, the web browser 420 can store the above-described information and can use the stored information. Further, if the address is a fixed value, the system does not require any designation from the web application 410.

Processing to be performed in step S708 corresponds to the processing to be performed in step S508 illustrated in FIG. 5. In step S708, the upload processing unit 425 requests the web application 410 to upload the execution result 1000, or the error result 1100, via the communication unit 421, using a POST command of the HTTP protocol, according to the request from the control unit 432. In this case, the upload processing unit 425 transmits an upload request to the address 804 designated by the control unit 432 of the transfer application 430.

Referring back to FIG. 5, in step S509, the web application 410 returns a response including screen display HTML contents to the web browser 420. When the web browser 420 receives a response in step S700 and if the type in the Content-Type field of the HTTP response header is not application/vnd.eeeee.webservice (NO in step S701), the operation proceeds to step S710. If the web browser 420 receives the response, then in step S710, the web browser 420 displays an operation screen on the UI display device 207 based on an analysis result of the HTML data obtained by the analyzing unit 422.

FIG. 7A illustrates an example of the HTTP response header 800 according to the present exemplary embodiment, which can be transmitted from the web application 410 to the web browser 420. The HTTP response header 800 includes address 801, time-out time 802, transfer content type 803, upload address 804, and content type 805.

The address 801 is an address to be referred to when the transfer application 430 transfers the HTTP response body (i.e., the processing request 900) in step S703 illustrated in FIG. 6B. The address 801 indicates any one of available services that are opened to the public through a plurality of service providers.

The time-out time 802 is a time-out time (sec) in the communication between the control unit 432 of the transfer application 430 and the service provider 440 via the operation request transmitting unit 431 in step S703 and step S705. The control unit 432 measures the processing time during the communication with the service provider 440, and stops the communication when the measured time exceeds the designated time-out time 802.

The transfer content type 803 is a content to be described in the Content-Type field of the HTTP response header 800 when the transfer application 430 transfers the HTTP response body to the service provider 440 in step S703. This is because the service provider 440 (i.e., transfer destination) is required to accurately identify the Content-Type in the transfer of the response using a POST command of the HTTP protocol. In a case where the transfer content type 803 is omitted, the transfer application 430 can set a default value to be used in the above-described transfer operation.

The upload address 804 is an address to be referred to, as described above, in requesting the web browser 420 to upload the processing result 1000 to the web application 410 in step S707 and step S709.

The content type 805 can be used, as described above, in determining whether the content of the HTTP response body received in step S701 is the processing request or the HTML content to be displayed by the web browser 420.

FIG. 7B illustrates an example content of the processing request 900 that can be generated by the web application 410 and returned to the web browser 420. The processing request 900 includes scanning request 901 and transmission request 902. The processing request 900 is described using the eXtensible Markup Language (XML) format, although any other format is usable if it can be processed by the MFP 101 based on processing contents described therein.

The scanning request 901 is an instruction that requests the MFP 101 to execute scanning processing. Further, the scanning request 901 includes a description relating to scanning control settings. For example, the scanning request 901 includes a <DocumentSize> tag that can designate the size of a document to be scanned and a <Color> tag that can designate a color mode (auto, color, or gray scale) in a scanning operation.

The transmission request 902 is an instruction that requests the MFP 101 to transmit a scanning result image. Further, the transmission request 902 can include a description relating to transmission control settings. For example, the transmission request 902 includes a <Protocol> tag that can designate the transmission protocol, a <Destination> tag that can designate the address, and a <FileFormat> tag that can designate the image conversion format to be used in the transmission.

Figure 8A:
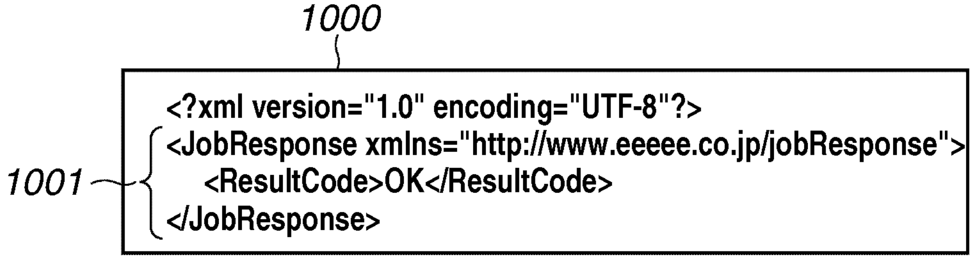
FIGS. 8A and 8B illustrate examples of a processing result.

FIG. 8A illustrates the content of a processing result 1000 that can be returned from the service provider 440. The processing result 1000 includes a job result 1001. The job result 1001 includes a <ResultCode> tag that describes a result of the job executed in step S705. If no error occurs in the processing of the job, an OK code is described in the <ResultCode> tag. If an error occurs, an error code is described in the <ResultCode> tag. The web application 410 receives the processing result 1000 via the upload processing unit 425 of the web browser 420. The web application 410 can generate an HTML content that corresponds to the processing result for a user, and can transmit the generated HTML content to the web browser 420.

Figure 8B:
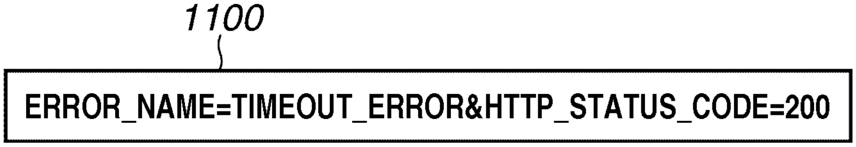

FIG. 8B illustrates an error content that can be generated by the control unit 432 of the transfer application 430 when an error occurs in the transfer application 430. The error result 1100 described in FIG. 8B includes an error code and an HTTP status code used when the transfer application 430 communicates with the service provider 440 using the HTTP protocol.

If an error occurs in the operation request transmitting unit 431 or the control unit 432 of the transfer application 430, the control unit 432 generates the error result 1100. Then, similar to the upload request of the processing result in step S705, the control unit 432 requests the web browser 420 to upload error contents. In the present exemplary embodiment, the designated Content-Type is application/x-www-form-urlencoded and the transmitted parameters are the error code and the HTTP status code.

For example, if the processing time exceeds the designated time-out time 802 in the communication between the transfer application 430 and the service provider 440, the control unit 432 stops the communication and generates an error result indicated by an error code "TIMEOUT_ERROR." Further, if the service provider 440 returns an abnormal HTTP status code, the control unit 432 generates an error result indicated by a status code and an error code "STATUS_CODE_ERROR."

Figure 9:
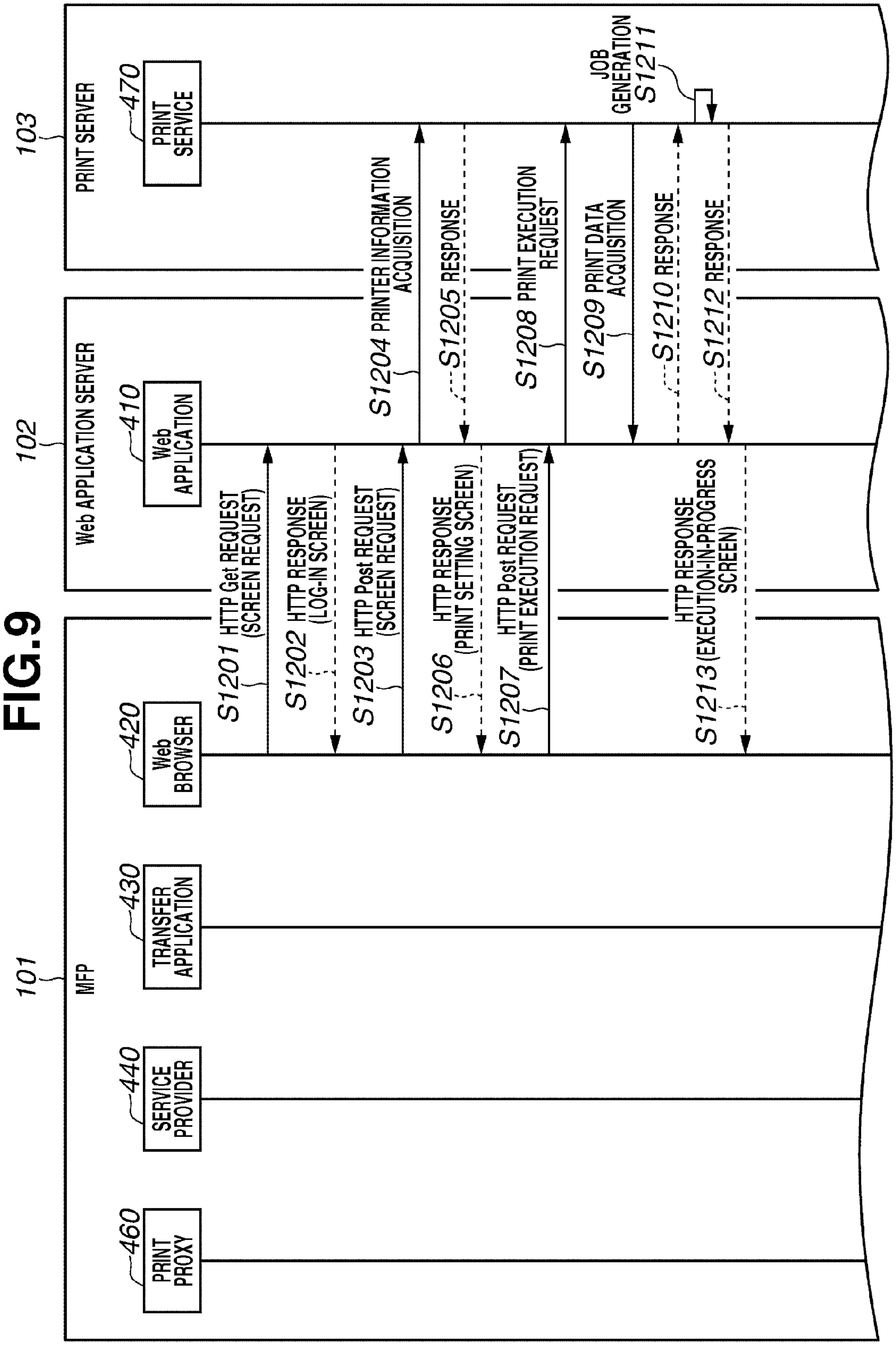
FIG. 9 is a sequence diagram illustrating print processing according to an exemplary embodiment.
Figure 10:
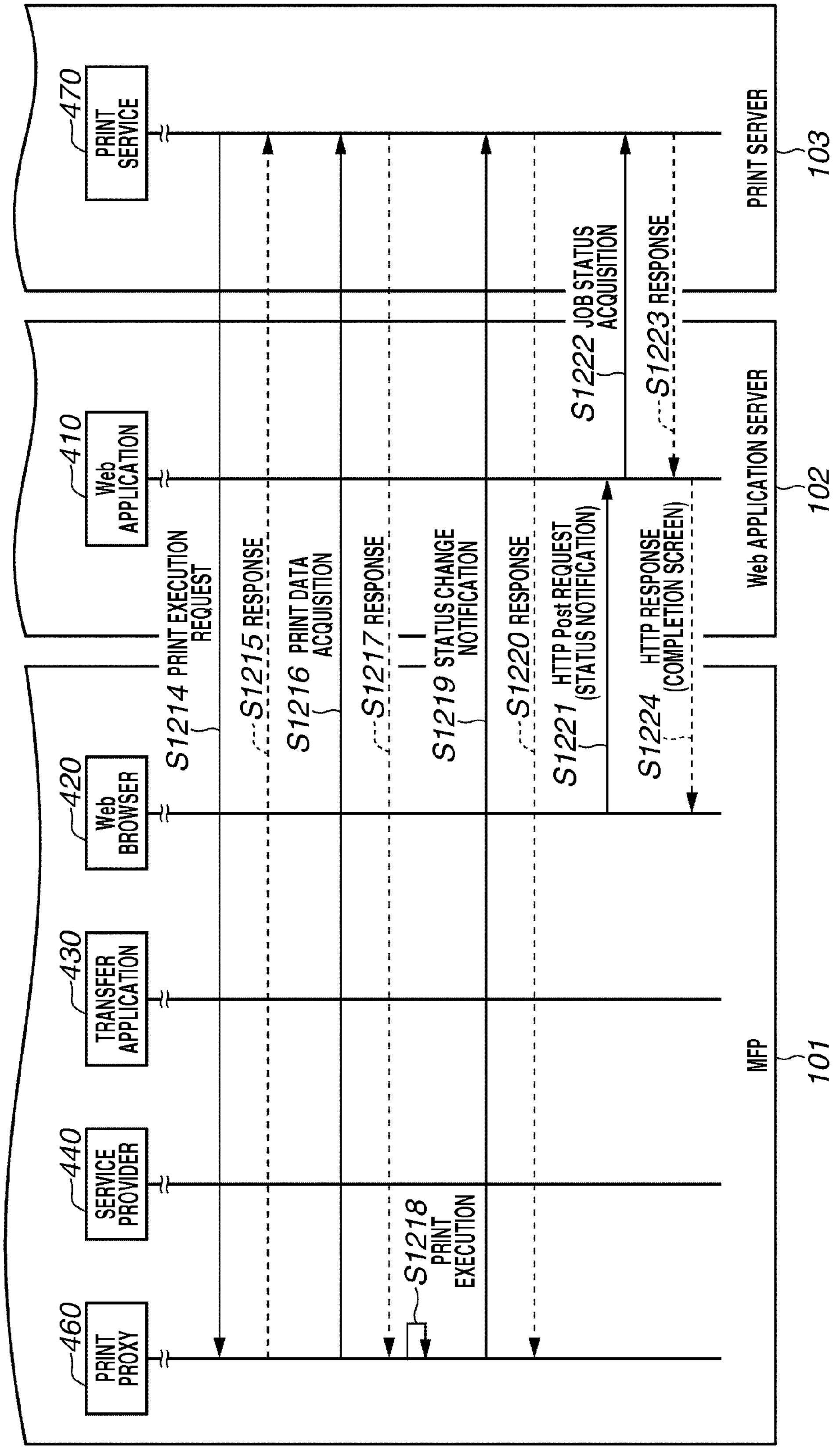
FIG. 10 is a sequence diagram illustrating print processing according to an exemplary embodiment.

The content printing system according to the present exemplary embodiment can perform print processing in the following manner. FIG. 9 and FIG. 10 are sequence diagrams illustrating sequential processing that can be performed by the content printing system when the system executes printing using the print service according to the present exemplary embodiment. First, if a user presses a web browser launching button (not illustrated) via the user input device 206 of the MFP 101, the system launches the web browser 420.

In step S1201, the web browser 420 sends an HTTP GET command including a log-in screen request to the web application 410 of the web application server 102. In the present exemplary embodiment, the URL indicating log-in screen contents is set beforehand in the MFP 101. More specifically, the communication unit 421 of the web browser 420 communicates with the presentation unit 411 of the web application server 102 according to the HTTP protocol. Through the above-described communication, the web browser 420 transmits a request to the web application 410. In the following description, operations to be performed by the communication unit 421 are omitted.

In step S1202, the logic unit 412 of the web application 410 generates HTML data of the log-in screen in response to the request received from the web browser 420 (see step S1201). The presentation unit 411 transmits the generated screen data, as an HTTP response, to the web browser 420. The analyzing unit 422 of the web browser 420 analyzes the received HTML data. The screen display unit 423 displays the log-in screen on the UI display device 207.

Figure 11A:
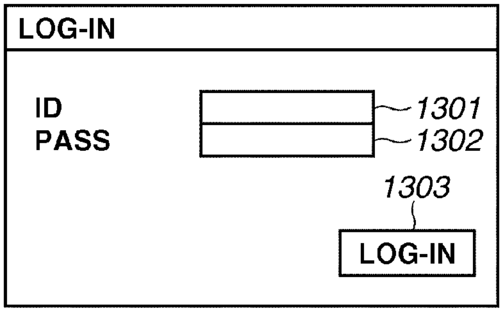
FIGS. 11A, 11B, and 11C are examples of a log-in screen and a setting screen of the content printing system.

FIG. 11A illustrates an example of the log-in screen, which allows a user to input ID information and a password in an ID input field 1301 and a password input field 1302, respectively, to use the print service 470.

If a user presses a log-in button 1303 on the log-in screen displayed in step S1202, then in step S1203, the web browser 420 instructs the web application 410 to execute log-in processing. More specifically, the web browser 420 sends a notification including the ID information and the password having been set on the log-in screen to the web application 410. In this case, a POST command of the HTTP/HTTPS protocol is usable in the communication between the web browser 420 and the web application 410.

In step S1204, the printer information acquisition unit 413 of the web application 410 logs in the print service 470 using the ID information and the password notified in step S1203. Next, the printer information acquisition unit 413 transmits a printer information acquisition request to the printer information presenting unit 477 of the print service 470. The log-in method usable in this case is Basic Authentication or web service authentication, although any method is usable if the method can verify the correctness of user authority. In step S1205, the printer information presenting unit 477 acquires printer information from the printer information storing unit 473 via the control unit 472 and transmits the acquired printer information to the printer information acquisition unit 413.

Figure 11B:
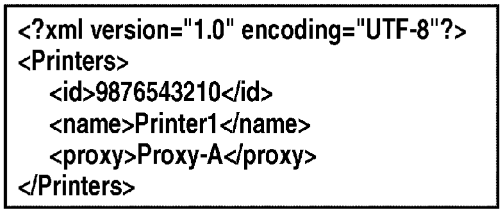

FIG. 11B illustrates an example of the printer information, which includes printer ID 1301 and printer name of a printer that a user can use. In step S1206, the logic unit 412 of the web application 410 generates a print setting screen that allows the user to select a printer and input print settings, based on the printer information acquired in step S1205. Next, the presentation unit 411 transmits the generated print setting screen to the web browser 420. The analyzing unit 422 of the web browser 420 analyzes HTML data of the received print setting screen and causes the screen display unit 423 to display the print setting screen on the UI display device 207.

Figure 11C:
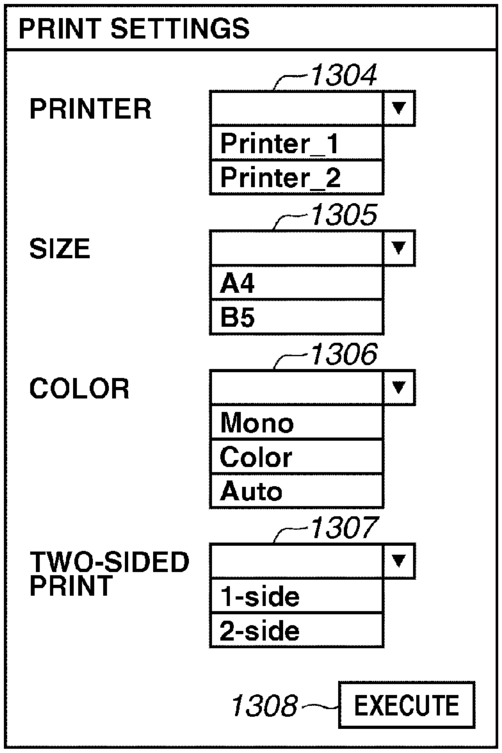

FIG. 11C illustrates an example of the print setting screen, which includes a printer selection list box 1304 that allows a user to select a desired printer that performs printing from a list of printers that the user can use. In the present exemplary embodiment, the user selects a printer that corresponds to the MFP 101. Further, the print setting screen illustrated in FIG. 11C includes a size selection list box 1305, a color selection list box 1306, and a two-sided print selection list box 1307, which enable the user to select a print paper size and a print color mode and perform one-sided/two-sided setting.

If a user presses an execution button 1308 on the print setting screen displayed in step S1206, then in step S1207, the web browser 420 instructs the web application 410 to request printing. More specifically, the web browser 420 sends a notification including information having been set on the print setting screen to the web application 410. In this case, a POST command of the HTTP protocol is usable in the communication between the web browser 420 and the web application 410.

In step S1208, the print instruction unit 414 of the web application 410 transmits a print instruction to the print instruction receiving unit 476 of the print service 470. More specifically, the print instruction unit 414 is functionally operable as a print instruction unit configured to instruct the print service to perform printing, via the network, according to a print request received from the web browser 420. When the print instruction receiving unit 476 receives the print instruction, the print instruction receiving unit 476 sends the print instruction to the control unit 472.

FIG. 12A illustrates an example of the print instruction transmitted to the print service 470, which includes ID information 1401 that includes a print instruction to be supplied to the print service 470 and print settings 1402 of a printer to be used, which have been transmitted to the web application 410 in step S1207. Further, the print instruction includes a destination 1403 of print contents described in the print settings 1402. In this case, if the print settings include file format conversion settings, the print instruction unit 414 causes the print service 470 to perform file format conversion according to the print settings. The print service 470 generates print data through the file format conversion.

In step S1209, the print data information acquisition unit 471 transmits a request to the web application 410 according to an instruction from the control unit 472, to acquire print data from the location indicated by the destination 1403 of the print contents included in the print settings. In step S1210, the web application 410 sends the print data to the print data information acquisition unit 471 as a response replying to the request received in step S1209. The print data information acquisition unit 471 sends the received print data to the control unit 472.

The web application 410 or another file server can store the print contents. Further, in the present exemplary embodiment, the print data can be acquired when the print data information acquisition unit 471 transmits a request to the web application 410. However, the system can be configured in such a way as to transmit the print data to the print service 470 when the web application 410 transmits a print execution request in step S1208. Further, in the present exemplary embodiment, the communication protocol in the print data acquisition is HTTP/HTTPS. However, any other protocol can be used if the print service 470 can acquire print data.

In step S1211, the control unit 472 stores the print data in the print data storing unit 481 and stores the print service print settings in the print setting storing unit 482. If the print settings include a file format designated by the user, then in step S1211, the print data information acquisition unit 471 refers to a printable data format with reference to printer information of a printer to be used. Further, if necessary, print data information acquisition unit 471 performs data format conversion. Further, in the present exemplary embodiment, the print data information acquisition unit 471 determines the data format based on the acquired print data.

Alternatively, in step S1208, the web application 410 can instruct the data format of the print data to be converted. If the print instruction receiving unit 476 receives a storage completion notice from the print data storing unit 481 and the print setting storing unit 482, the print instruction receiving unit 476 generates job information and stores the generated job information in the job status storing unit 474. The job information includes job ID (i.e., unique ID that can identify each job) and job status information (i.e., execution status of the job).

In step S1212, the print instruction receiving unit 476 returns a response replying to the print instruction request received in step S1208 to the print instruction unit 414 after completing the storage of the job information into the job status storing unit 474.

FIG. 12B illustrates an example of the response replying to the print instruction transmitted to the print service 470. The response illustrated in FIG. 12B includes a description 1404 of the job ID included in the job information generated by the print instruction receiving unit 476 (see step S1211). In step S1213, the logic unit 412 of the web application 410 generates an execution-in-progress screen. Next, the presentation unit 411 transmits the generated screen (i.e., the execution-in-progress screen) to the web browser 420.

FIG. 13A illustrates an example of the execution-in-progress screen according to the present exemplary embodiment, in which a message "print execution is in progress" is displayed. FIG. 13C illustrates HTML data of the execution-in-progress screen illustrated in FIG. 13A. The execution-in-progress screen data includes a description relating to polling setting 1501. The web browser 420 transmits a job information screen acquisition request to the web application 410 according to the polling setting 1501 after a predetermined time has elapsed. The job information screen acquisition request is a request requiring transmission of a job information screen corresponding to the job status managed by the print service 470.

In step S1214, the print notification transmitting unit 483 transmits a printer print instruction to the print notification receiving unit 465 of the print service communication module 460 according to an instruction of the control unit 472. In the present exemplary embodiment, the print notification transmitting unit 483 transmits the printer print instruction to the print notification receiving unit 465. Alternatively, the print notification receiving unit 465 can periodically request the print notification transmitting unit 483 to transmit the printer print instruction.

FIG. 14 illustrates an example of the printer print instruction, which includes print data acquisition destination information 1601 and print setting acquisition destination information 1602.

In step S1215, if the print notification receiving unit 465 receives the printer print instruction, the print notification receiving unit 465 returns a response to the print notification transmitting unit 483.

In step S1216, the print data acquisition unit 462 transmits a print data request to the location described in the print data acquisition destination information 1601 of the printer print instruction. Further, the print setting acquisition unit 464 requests the location described in the print setting acquisition destination information 1602 of the printer print instruction to transmit printer print settings.

In step S1217, the print data storing unit 481 transmits the print data to the print data acquisition unit 462 as a response replying to the request generated in step S1216. The print data acquisition unit 462 sends the received print data to the control unit 467. Further, the print setting storing unit 482 transmits printer print settings, as a response replying to the request generated in step S1216, to the printer print setting acquisition unit 464. The print setting acquisition unit 464 sends the received print settings to the control unit 467.

FIG. 15 illustrates example printer print settings, which includes a description relating to print paper size, color setting, and two-sided setting.

In step S1218, the control unit 467 requests the print job generation unit 466 to generate a printer print job based on the print data and the printer print settings acquired in step S1216 and step S1217. When the print job generation unit 466 receives a print job generation request, the print job generation unit 466 generates a printer print job and registers the generated job in the job management unit 451. The job execution unit 452 constantly monitors the job management unit 451. If a printer print job is input to the job management unit 451, the job execution unit 452 executes the printer print job.

In step S1219, the control unit 467 sends a job status transmission instruction to the job status transmitting unit 463 upon completion of the printer print job. The job status transmitting unit 463 transmits a job status change notification to the job status receiving unit 484 according to an instruction from the print control unit. When the job status receiving unit 484 receives the job status change notification, the job status receiving unit 484 sends the job status change notification to the control unit 472. The control unit 472 updates the job status of the job stored in the job status storing unit 474 according to the received print status change notification, and manages the updated job status. In this case, the control unit 472 updates the job status of the job that coincides with the job ID described in the job status change notification.

FIG. 16A illustrates an example of the job status change notification, which includes job ID 1801 of the job whose job status has changed and changed status 1802. In step S1220, the job status receiving unit 484 returns a response replying to the job status change notification to the job status transmitting unit 463.

FIG. 16B illustrates an example of the response replying to the job status change notification, which includes a description indicating whether the change in job status was successful. In this case, the job status transmitting unit 463 can resend the print status change notification depending on success/failure of the job status change.

In step S1221, the web browser 420 periodically transmits the job information screen acquisition request to the web application 410, according to the polling setting 1501 described in the execution-in-progress screen received in step S1213. Then, the web application 410 periodically receives the job information screen acquisition request from the web browser 420.

In step S1222, the job status acquisition unit 415 of the web application 410 transmits a job status acquisition request to the job status presenting unit 478 of the print service 470.

FIG. 17A illustrates an example of the job status acquisition request, which includes job ID 1901 that can identify a target job. In step S1223, the job status presenting unit 478 acquires job status information of the target job from the job status storing unit 474. The job status presenting unit 478 generates a response replying to the job status acquisition request and transmits the generated response to the job status acquisition unit 415.

FIG. 17B illustrates an example response replying to the job status acquisition request, which includes job status information 1902. The job status acquisition unit 415 acquires the job status information 1902 from the response. More specifically, the job status acquisition unit 415 is functionally operable as a print status acquisition unit configured to acquire job status (i.e., print status) information managed by the print service 470 via the network.

More specifically, when the job status acquisition unit 415 of the web application 410 receives the job information screen acquisition request from the web browser 420 (see step S1221), the job status acquisition unit 415 acquires print status information from the print service 470. As described above, the web browser 420 sends the job information screen acquisition request according to the polling setting 1501. Accordingly, the job status acquisition unit 415 can acquire the job status information from the print service 470 based on the polling periodically performed after the print instruction unit 414 has output the print instruction to the print service 470.

In step S1224, the logic unit 412 generates a job information screen that corresponds to the job status indicated by the response replying to the job status acquisition request acquired in step S1223. More specifically, the logic unit 412 is functionally operable as a screen generation unit configured to generate a job information screen according to the acquired print status. The logic unit 412 generates an update screen according to the print status if the acquired job status is changed.

According to the illustrated example, the job status acquisition unit 415 of the web application 410 receives the response from the print service 470 after the MFP 101 has transmitted the job status change notification to the print service 470 (step S1219 illustrated in FIG. 10). Accordingly, the job status information 1902 included in the response is already changed from the previous job status that precedes the above-described job status change notification. As a result, the logic unit 412 can generate the update screen that corresponds to the changed job status.

Next, the presentation unit 411 transmits the job information screen generated by the logic unit 412 to the web browser 420. More specifically, the presentation unit 411 is functionally operable as a screen transmission unit configured to transmit the job information screen generated by the logic unit 412 to the web browser 420 via the network. The screen display unit 423 of the web browser 420 displays the job information screen received from the presentation unit 411. In the present exemplary embodiment, the status indicating the print completion is already acquired in step S1223. Therefore, the web application 410 generates a completion screen and transmits the generated completion screen to the web browser 420.

As described above with reference to FIG. 9 and FIG. 10, the MFP 101 acquires print data generated by the print service 470 and executes printing based on the print data acquired from the print service 470 (see step S1218 illustrated in FIG. 10). Then, the MFP 101 notifies the print service 470 of the changed print status each time the print status has changed and causes the print service 470 to manage the changed print status (see step S1219 illustrated in FIG. 10). Then, the job status acquisition unit 415 of the web application server 102 acquires the changed print status that is managed by the print service 470 (step S1223 illustrated in FIG. 10).

If the printing is not yet completed, the presentation unit 411 transmits the contents including the description relating to the polling setting 1501 to the web browser 420. Subsequently, the processing proceeds to step S1221. If the printing has been completed, the screen display unit 423 displays a message “printing has been completed!” on the completion screen as illustrated in FIG. 13B.

As described above, the system according to the first exemplary embodiment can perform printing using an external print service having a file format conversion function. Thus, the system according to the first exemplary embodiment can provide a print function via the web application at a lower cost in response to a file format conversion request. Further, when the job status has changed, the web application sends a notification including the job information screen that indicates a job status changed in the external print service to the web browser. Therefore, the system according to the first exemplary embodiment can provide an infrastructure that can distribute contents to periodically update the web browser screen. The system can update the job information screen of the device for each print status according to a change in the job status provided by the external print service.

According to the first exemplary embodiment, the web application 410 sends a job status request to the web browser 420 to acquire job status information from the print service 470. The print proxy 460 of the MFP sends a notification to the print service 470 to update the job status of the print service 470. Further, the polling periodically performed from the web application 410 to the print service 470 is required to enable the screen display unit 423 of the web browser 420 to display the update screen. However, the burden of the web application server 102 will increase significantly if the polling from the web application 410 to the print service 470 is performed so frequently.

In view of the foregoing, a second exemplary embodiment provides a processing system that causes the web application 410 to directly notify job status information when a job status update notice is received from the MFP that includes the print proxy. Differences between the second exemplary embodiment and the first exemplary embodiment are described below with reference to the attached drawings.

Figure 18:
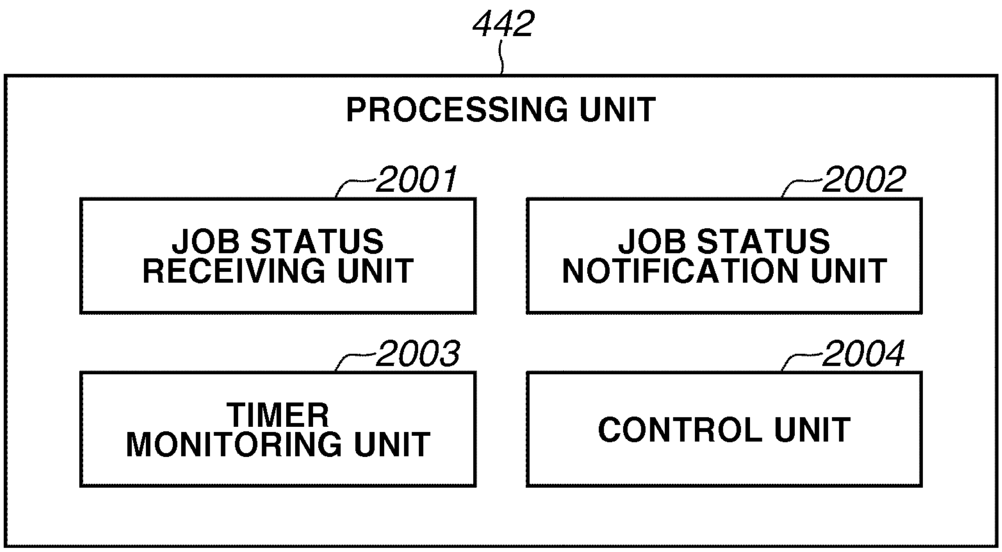
FIG. 18 is a block diagram illustrating an example configuration of a processing unit of a service provider according to an exemplary embodiment.

FIG. 18 illustrates an example configuration of the processing unit 442 included in the service provider 440. In the second exemplary embodiment, the processing unit 442 includes a job status receiving unit 2001 that is functionally operable as a print status reception unit, a job status notification unit 2002, a timer monitoring unit 2003, and a control unit 2004.

The operation request transmitting unit 431 receives an operation request from the web application 410 via the web browser 420. Next, the operation request receiving unit 441 receives the operation request from the operation request transmitting unit 431 and sends the received operation request to the processing unit 442. The control unit 2004 of the processing unit 442 instructs the job status receiving unit 2001 to monitor the job status according to the operation request received by the operation request receiving unit 441. The operation request according to the second exemplary embodiment includes the job status designated by the web application 410, more specifically, the request of the print status change notification. Further, if the control unit 2004 receives a job status change notification from the job status receiving unit 2001, the control unit 2004 requests the job status notification unit 2002 (that is functionally operable as a print status notification unit) to notify the job status.

An example transmission of the above-described operation request is described in detail below. First, if the web application server 102 receives a print execution request from the web browser 420, the web application server 102 requests the print service 470 to generate a job. The print service 470 generates a requested job and transmits the generated job to the web application server 102. As illustrated in step S2312 of FIG. 21, the web application server 102 receives the generated job. Next, the logic unit 412 of the web application server 102 generates a processing request that requires notification of a change in job status of the job.

In step S2313, the presentation unit 411 transmits the generated processing request to the web browser 420 of the MFP 101. The processing request includes job ID and job status information. The job ID included in the processing request is identification information of the job that corresponds to the notification of a change in job status. In the present exemplary embodiment, the job status included in the processing request is a job status designated by the web application server 102. However, the web application 410 can arbitrarily change the above-described designations according to the contents input by a user via the web browser 420. Further, the job ID can be generated by the web application 410 or the print service 470.

The processing request is a request that requires notification of a change in job status on condition that the job having the above-described job ID becomes the designated job status. The operation request transmitting unit 431 transmits the job ID and the job status information included in the processing request received by the web browser 420, as the operation request, to the operation request receiving unit 441. Similar to the processing request, the operation request is a request that requires notification of a change in job status on condition that the job having the above-described job ID becomes the designated job status. More specifically, the operation request transmitting unit 431 is functionally operable as an operation request unit configured to transmit an operation request that includes print status information designated by the web application 410. In the present exemplary embodiment, the operation request is a print completion request. Therefore, the operation request includes a description relating to print completion (DONE).

Further, in response to a change in each job status, the job status transmitting unit 463 transmits the changed job status to the job status receiving unit 484 of the print service 470. More specifically, the job status transmitting unit 463 is functionally operable as a print status transmission unit configured to transmit print status information to the print service 470 via the network. Further, the job status transmitting unit 463 transmits the print status, transmitted to the print service 470 via the job status receiving unit 2001, to the job status receiving unit 484.

FIG. 19 illustrates an example of the operation request received by the operation request receiving unit 441. The operation request illustrated in FIG. 19 includes job ID 2101 of a job to be notified, job status 2102 (more specifically, print completion status) to be notified, and notification destination 2103.

When the job status receiving unit 2001 receives a job status change notice from the job status transmitting unit 463, the job status receiving unit 2001 notifies the control unit 2004 of job ID and job status of a job whose job status has changed. The job status transmitting unit 463 transmits a job status that matches the job status transmitted to the job status receiving unit 484 of the print service 470 to the job status receiving unit 2001. More specifically, the job status receiving unit 2001 is functionally operable as a reception unit configured to receive a job status transmitted from the job status transmitting unit 463 to the print service 470.

The job status receiving unit 2001 sends the job ID and the job status information received from the job status transmitting unit 463 to the control unit 2004. The control unit 2004 compares the job ID and the job status information received from the job status receiving unit 2001 with the job ID and the job status information included in the operation request. If the job status received from the job status receiving unit 2001 is the job status included in the operation request, the control unit 2004 requests the job status notification unit 2002 to transmit a job status change notification.

More specifically, the control unit 2004 is functionally operable as a change notification generation unit configured to compare a job status included in an operation request with a job status received by the job status receiving unit 2001 and generate a job status change notification based on a comparison result. In the present exemplary embodiment, the control unit 2004 requests the job status notification unit 2002 to transmit the job status change notification only when the following conditions are satisfied.

More specifically, the control unit 2004 requires the job status change notification only when the job ID and the job status information included in the operation request received from the operation request transmitting unit 431 coincide with the job ID and the job status information that the job status receiving unit 2001 has received from the job status transmitting unit 463. However, embodiments can employ arbitrary conditions as far as the control unit 2004 requests a job status change notification based on a comparison between job ID and job status information included in an operation request and job ID and job status information received by the job status receiving unit 2001. In another embodiment, the control unit 2004 requests the job status notification unit 2002 to transmit the job status change notification when at least the above conditions are satisfied.

Figure 22:
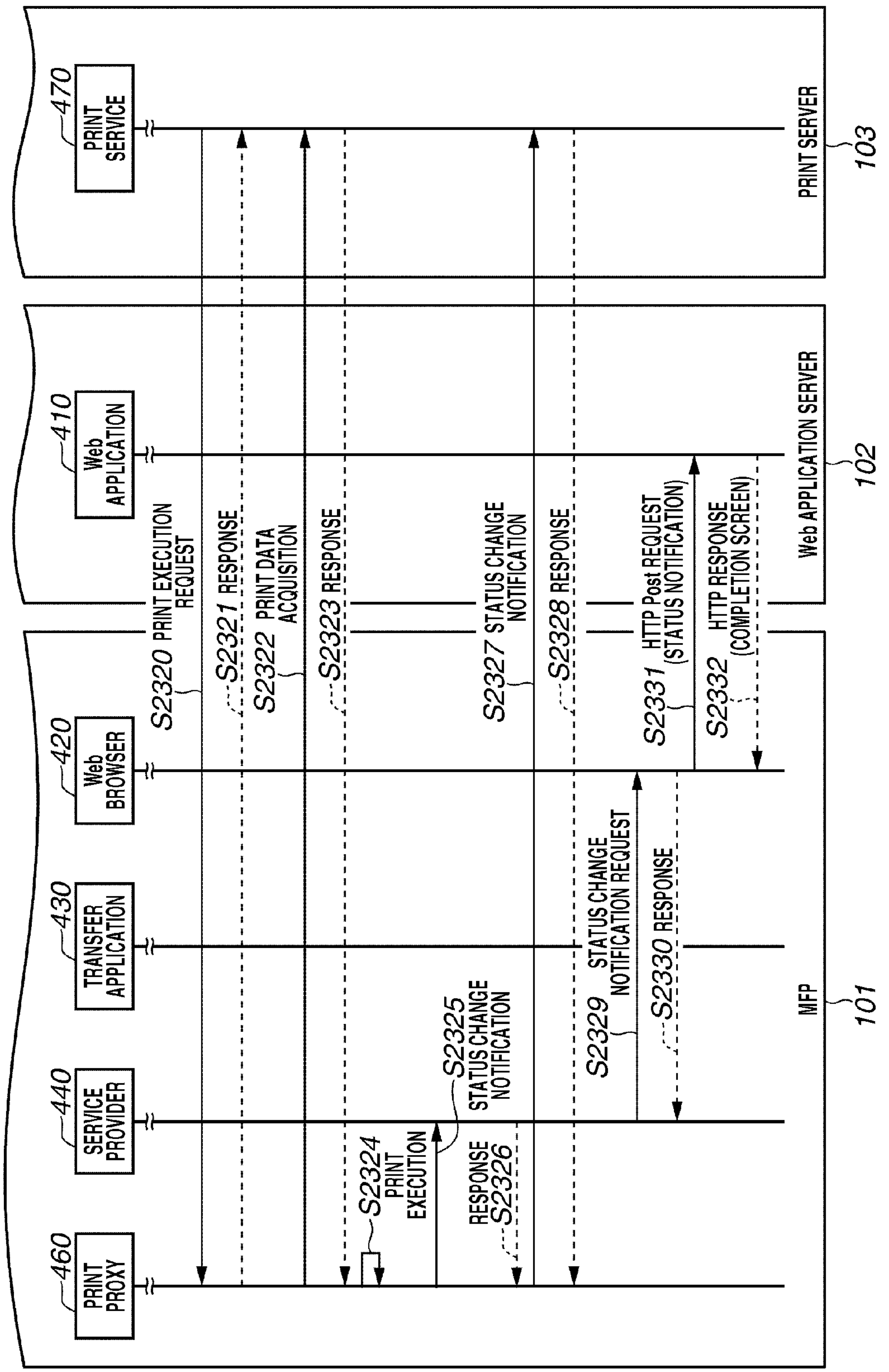
FIG. 22 is a sequence diagram illustrating print processing according to an exemplary embodiment.

As illustrated in FIG. 22, the job status notification unit 2002 generates a job status change notification 2201 according to an instruction from the control unit 2004 and sends the job status change notification 2201 to the upload processing unit 425 of the web browser 420. The web browser 420 transmits the job status change notification 2201 to the web application 410 and requests the web application 410 to upload the job status. More specifically, the job status notification unit 2002 is functionally operable as a notification unit configured to transmit a job status change notification to the web application server 102 via the web browser 420.

FIG. 20A illustrates an example of the job status change notification, which includes job ID of a job whose job status has changed and a description relating to the changed status (job status).

The job status acquisition unit 415 of the web application server 102 acquires job status information that corresponds to the designated job status. The logic unit 412 generates an update screen according to the acquired job status. Then, the presentation unit 411 transmits the update screen generated by the logic unit 412 to the web browser 420 via the network. The screen display unit 423 of the web browser 420 displays the update screen received from the presentation unit 411.

The timer monitoring unit 2003 can start monitoring the timer when the control unit 2004 receives an operation request via the operation request receiving unit 441. The timer monitoring unit 2003 can notify the control unit 2004 of an elapse of a predetermined time. More specifically, the timer monitoring unit 2003 is functionally operable as a timer monitoring unit configured to determine whether a predetermined time has elapsed since the control unit 2004 has received an operation request. The timer monitoring unit 2003 performs the timer monitoring for each job ID 2101.

The control unit 2004 receives a notification from the timer monitoring unit 2003 and determines whether the predetermined time has elapsed. If it is determined that the predetermined time has elapsed, the control unit 2004 determines whether the print status received by the job status receiving unit 2001 has been changed to the job status included in the operation request. More specifically, the control unit 2004 is functionally operable as a time-out determination unit configured to determine that the time-out has occurred when the print status is not changed to the job status included in the operation request.

More specifically, the control unit 2004 receives a notification including the job ID 2101 from the timer monitoring unit 2003. If the job status of the job is not yet changed to the job status 2102 (more specifically, print completion status) to be notified, the control unit 2004 determines that the time-out has occurred. If it is determined that the time-out has occurred, the control unit 2004 requests the control unit 467 of the print proxy 460 to cancel the job. In response to the received request, the control unit 467 cancels the job registered in the job management unit 451. More specifically, the control unit 467 is functionally operable as a cancellation unit configured to cancel the printing corresponding to the operation request if the time-out determination unit (i.e., the control unit 2004) determines that the time-out has occurred. More specifically, the control unit 467 cancels the job that corresponds to the job ID if the job status of the job is not yet changed to the job status of the job ID included in the operation request.

In some cases, generation of a job may be in progress in the print job generation unit 466 if no job is present in the job management unit 451. In this case, the generated job is registered to the job management unit 451 upon completing the job generation, and the job can be executed. Subsequently, the print status change notification may be transmitted to the job status receiving unit 484 of the print service 470 via the job status transmitting unit 463. Therefore, the control unit 467 cancels the job when a print instruction of the job is received in a state where no job is present in the job management unit 451. Thus, matching between the job status notified to the web application 410 and the job status notified to the print service can be realized. If the time-out has occurred, the control unit 2004 requests the job status notification unit 2002 to generate a job status change notification that indicate occurrence of an error.

FIG. 20B illustrates an example of the job status change notification that can be transmitted when the time-out has occurred. The illustrated job status change notification includes a job status ERROR 2202. In the present exemplary embodiment, the time-out time is a fixed value. However, the operation request can include a description relating to the time-out time so that the web application 410 can designate the time.

Figure 21:
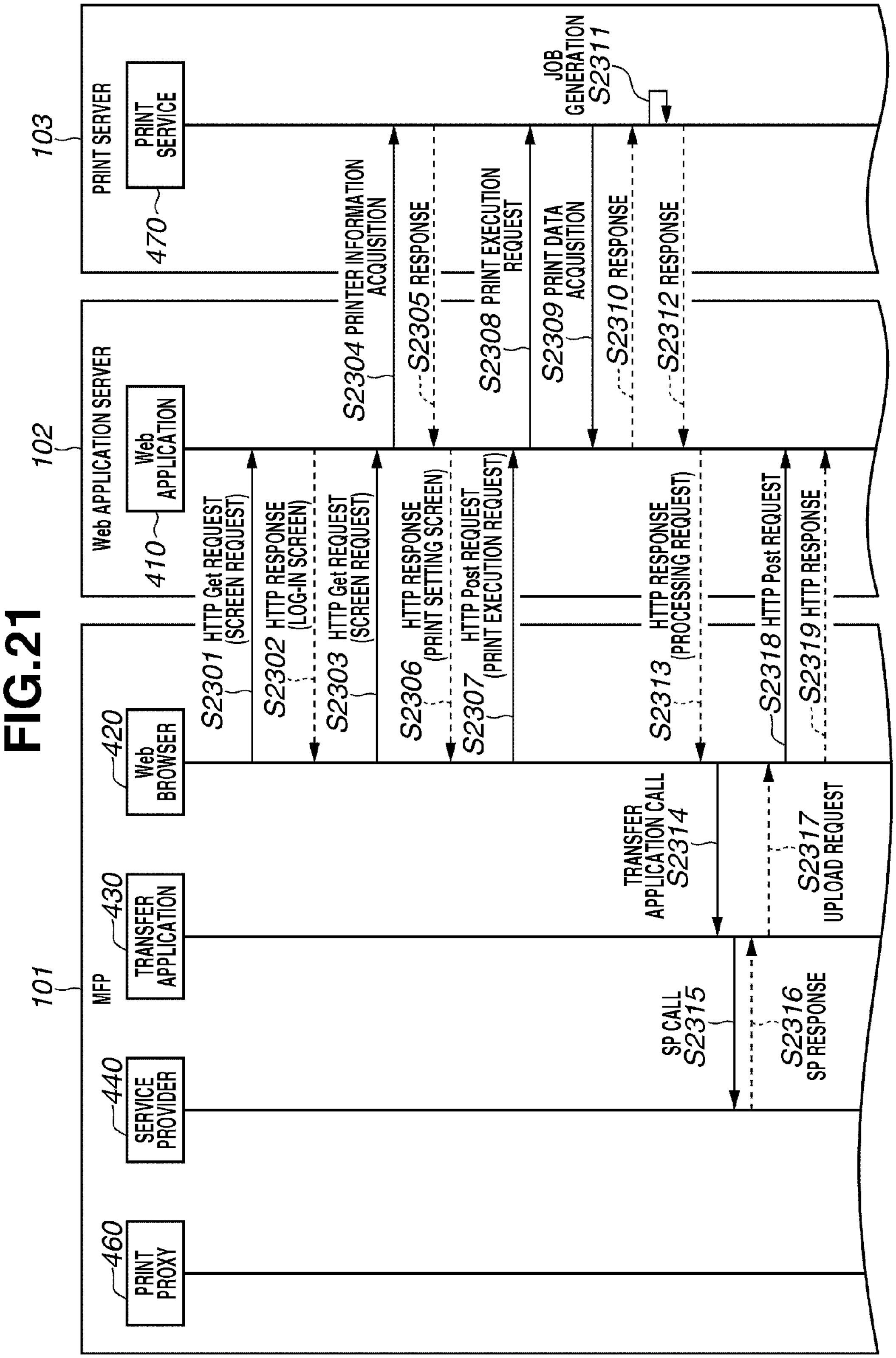
FIG. 21 is a sequence diagram illustrating print processing according to an exemplary embodiment.

FIGS. 21 and 22 are sequence diagrams illustrating sequential processing that can be performed by the information processing system according to the present exemplary embodiment when the system executes printing using the print service.

In step S2325 illustrated in FIG. 22, the job status transmitting unit 463 sends a notification including job ID of a job that changes the job status and changed job status to the job status receiving unit 2001. In step S2326, the job status receiving unit 2001 returns a response. In step S2329, the job status notification unit 2002 sends a job status change notification to the upload processing unit 425 of the web browser 420.

In step S2330, the upload processing unit 425 returns a response to the job status notification unit 2002. In step S2331, the upload processing unit 425 requests the web application 410 to provide a job information screen updated based on the job status change according to the request transmitted from the job status notification unit 2002 in step S2329. The request includes the job status change notification added by the upload processing unit 425. Thus, the job status acquisition unit 415 of the web application 410 acquires the job status included in the job status change notification.

In step S2332, the logic unit 412 of the web application 410 generates a job information screen that corresponds to the job status included in the job status change notification received in step S2331. Next, the presentation unit 411 transmits a response including the generated job information screen to the web browser 420. If the execution of the job is in progress, the web application 410 returns the execution-in-progress screen illustrated in FIG. 13A or FIG. 13C. Further, if the job is completed, the web application 410 returns the print completion screen illustrated in FIG. 13B. In a case where the web application 410 manages the job status, the web application 410 updates the status according to the received job status change notification.

In the second exemplary embodiment, the MFP 101 acquires print data generated by the print service 470 from the print service 470 and performs printing (see step S2324 illustrated in FIG. 22). Then, the MFP 101 notifies the print service 470 of the changed print status each time the print status changes and causes the print service 470 to manage the changed print status (see step S2327 illustrated in FIG. 22). On the other hand, the job status acquisition unit 415 of the web application server 102 acquires the changed print status that is managed by the print service 470 (see step S2331 illustrated in FIG. 22). More specifically, the job status acquisition unit 415 acquires the print data generated by the print service 470 from the print service 470 and directly acquires the print status, which is notified from the MFP 101 that performs printing each time the print status has changed, and managed by the print service 470, from the MFP 101.

According to the second exemplary embodiment, the web application 410 is not required to periodically inquire the print service 470 about the job status to check whether the job status has been updated. Similarly, the web browser 420 is not required to periodically send a request to the web application 410. Accordingly, the time lag between the update of the job status and the update of the display on the MFP 101 can be reduced. Further, the system according to the second exemplary embodiment can reduce the burden of the web application server 102 and the MFP 101 caused by the polling frequently performed.

In the above-described second exemplary embodiment, the job status notification unit 2002 included in the processing unit 442 of the service provider 440 transmits the job status change notification to the web application 410 via the web browser 420. However, if the web browser 420 does not have a function or an interface comparable to the upload processing unit 425, the service provider 440 cannot transmit the job status change notification to the web application 410 via the web browser 420. Hence, in a third exemplary embodiment, the job status notification unit 2002 is configured to directly send the notification to the web application 410 without using the web browser 420. The system according to the present exemplary embodiment can obtain effects similar to those described in the second exemplary embodiment, in an environment where the function or the interface comparable to the upload processing unit 425 is not available.

In the first exemplary embodiment, the second exemplary embodiment, and the third exemplary embodiment, it may be feasible to transmit the printer print instruction to the print notification receiving unit 465 by polling from the print notification receiving unit 465. In this case, it may take a long time for the print notification receiving unit 465 to receive the printer print instruction. Further, in a case where the print service 470 is performing a tied-up operation with a plurality of MFPs, a delay may occur in the processing of the print service 470 and the job status may not be promptly reflected.

To solve the above-described problems, in a fourth exemplary embodiment, when the control unit 2004 of the processing unit 442 receives an operation request via the operation request receiving unit 441 of the service provider 440, the print notification receiving unit 465 sends an inquiry to the print notification transmitting unit 483. The inquiry transmitted in this case functions as a print data acquisition request. The print data acquisition unit 462 receives notification information that corresponds to the inquiry from the print notification transmitting unit 483 and acquires print data from the print data storing unit 481 based on the content described in the received notification information.

More specifically, in the fourth exemplary embodiment, the print notification receiving unit 465 is functionally operable as a print data requesting unit configured to transmit a print data acquisition request to the print service 470, via the network, when the control unit 2004 receives an operation request. Therefore, it is feasible to reduce the time lag between the transmission of the print instruction from the web application 410 to the print service 470 and reception of the print instruction by the print proxy 460.

In the above-described first to fourth exemplary embodiments, the data illustrated in FIG. 11B, FIGS. 12A and 12B, FIG. 14, FIG. 15, FIGS. 16A and 16B, FIGS. 17A and 17B, FIG. 19, and FIGS. 20A and 20B are examples of XML format data. However, it is feasible to use another data format, such as JavaScript Object Notation (JSON), and anther data transmission/reception communication protocol, such as Simple Object Access Protocol (SOAP).

Other Embodiments

Further, the present invention can be realized by performing the following processing. More specifically, the processing includes providing software (computer program) capable of realizing the functions of the above-described exemplary embodiments to a system or an apparatus via a network or an appropriate storage medium. The processing further includes causing a computer (or CPU or MPU) of the system or the apparatus to read and execute the program. In this case, the program itself and a storage medium storing the program configure the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable storage medium may store a program that causes a printing system to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-187668 filed Aug. 30, 2011, which is hereby incorporated by reference herein in its entirety.

What is claimed is:

1. A printing system having a print service and an image forming apparatus including a web browser capable of displaying a screen provided from a web server, wherein the print service, the image forming apparatus, and the web server are connected with each other via a network, the printing system comprising:

the web server, wherein the web server includes:

a print instruction unit configured to transmit, to the print service via the network, a print instruction according to a print request received from the image forming apparatus, a print status acquisition unit configured to acquire, via the network, a print status of print data that corresponds to the print instruction managed by the print service, a screen generation unit configured to generate a job information screen that corresponds to the print status acquired by the print status acquisition unit, and a screen transmission unit configured to transmit, to the web browser via the network, the job information screen generated by the screen generation unit, wherein the print status acquisition unit acquires the print status of print data that corresponds to the print instruction managed by the print service based on information, wherein that information was notified, in response to a change in the print status of the print data, from an image forming apparatus that acquires the print data from the print service and executes printing based on the acquired print data.

2. The printing system according to claim 1, wherein, in response to the print request including a file format conversion settings, the print instruction unit is configured to cause the print service to perform file format conversion according to the file format conversion setting and cause the print service to generate the print data, wherein, in response to polling periodically performed after the print instruction unit has transmitted the print instruction to the print service, the print status acquisition unit is configured to acquire the print status from the print service, wherein, in response to a change in the print status acquired by the print status acquisition unit, the screen generation unit is configured to generate an update screen according to the print status in response to a change in the print status acquired by the print status acquisition unit, and wherein the screen transmission unit is configured to transmit the generated update screen to the web browser via the network.

3. The printing system according to claim 2, wherein the print status acquisition unit is configured to periodically receive, from the image forming apparatus, a job information screen acquisition request that corresponds to the print status managed by the print service and, in response to receiving a job information screen acquisition request, the print status acquisition unit acquires the print status from the print service.

4. The printing system according to claim 1, wherein the image forming apparatus includes:

a print status transmission unit configured to transmit, to the print service via the network, the print status in response to a change in the print status, an operation request unit configured to transmit, to the print status transmission unit, an operation request that includes the print status designated by the web server, wherein the operation request is a request requiring a print status change notification, a reception unit configured to receive, from the print status transmission unit, the print status to be transmitted by the print status transmission unit to the print service, a change notification generation unit configured to receive the operation request from the operation request unit, compare a print status included in the operation request with the print status received by the reception unit to produce a comparison result, and generate the print status change notification based on the produced comparison result, and a notification unit configured to transmit, to the web server via the web browser, the print status change notification, wherein the print status acquisition unit included in the web server further is configured to receive the print status change notification via the web browser of the image forming apparatus and acquire a print status that corresponds to the received print status change notification.

5. The printing system according to claim 4, wherein the image forming apparatus further includes:

a timer monitoring unit configured to determine whether a predetermined time has elapsed since the change notification generation unit receipt of the operation request, a time-out determination unit configured to determine, in response to the timer monitoring unit determining that the predetermined time has elapsed since the change notification generation unit receipt of the operation request, whether the print status received by the reception unit was changed to the print status included in the operation request, and, in response to determining that the print status received by the reception unit was not changed to the print status included in the operation request, the time-out determination unit determines that a time-out has occurred, and a cancellation unit configured to cancel, in response to the time-out determination unit determining that the time-out has occurred, the print status that corresponds to the operation request.

6. The printing system according to claim 4, wherein the notification unit is configured to transmit the print status change notification to the web server without using the web server.

7. The printing system according to claim 4, wherein the image forming apparatus further includes a print data requesting unit configured to transmit, to the print service via the network, a print data acquisition request in response to the change notification generation unit receiving the operation request from the operation request unit.

8. A print control method for a printing system having a print service and an image forming apparatus including a web browser capable of displaying a screen provided from a web server, wherein the print service, the image forming apparatus, and the web server are connected with each other via a network, the print control method comprising:

causing the web server to transmit, to print service via the network, a print instruction according to a print request received from the image forming apparatus;

causing the print service to receive the print instruction from the web server and generate print data according to the print instruction;

causing the image forming apparatus to acquire the print data from the print service and execute printing based on the acquired print data;

causing the print service to manage a print status of the print data based on information notified from the image forming apparatus in response to a change in the print status of the print data;

causing the web server to acquire, via the network, the print status of the print data that corresponds to the print instruction managed by the print service;

causing the web server to generate a job information screen that corresponds to the acquires print status managed by the print service; and causing the web server to transmit, via the network, the generated job information screen to the web browser.

9. A non-transitory computer-readable storage medium storing a program that causes a printing system to perform the method according to claim 8.

* * * * *